(12) United States Patent
Samuel et al.

(10) Patent No.: US 11,648,583 B2
(45) Date of Patent: *May 16, 2023

(54) METHOD FOR PRODUCING COATED CONTACT LENSES

(71) Applicant: Alcon Inc., Fribourg (CH)

(72) Inventors: Newton T. Samuel, Suwanee, GA (US); Yongxing Qiu, Suwanee, GA (US); John Dallas Pruitt, Suwanee, GA (US); Matthew McCollum, Alpharetta, GA (US)

(73) Assignee: Alcon Inc., Fribourg (CH)

( * ) Notice: Subject to any disclaimer, the term of this patent is extended or adjusted under 35 U.S.C. 154(b) by 457 days.

This patent is subject to a terminal disclaimer.

(21) Appl. No.: 16/843,989

(22) Filed: Apr. 9, 2020

(65) Prior Publication Data

US 2020/0324314 A1 Oct. 15, 2020

Related U.S. Application Data

(60) Provisional application No. 62/831,876, filed on Apr. 10, 2019.

(51) Int. Cl.
| | |
|---|---|
| *B05D 1/18* | (2006.01) |
| *G02B 1/18* | (2015.01) |
| *C09D 5/00* | (2006.01) |
| *C09D 133/02* | (2006.01) |
| *B05D 3/02* | (2006.01) |
| *B05D 3/10* | (2006.01) |
| *G02C 7/04* | (2006.01) |

(52) U.S. Cl.
CPC ............ *B05D 1/18* (2013.01); *B05D 3/0209* (2013.01); *B05D 3/107* (2013.01); *C09D 5/002* (2013.01); *C09D 133/02* (2013.01); *G02B 1/18* (2015.01); *B05D 2258/00* (2013.01); *B05D 2401/20* (2013.01); *B05D 2401/21* (2013.01); *B05D 2502/00* (2013.01); *G02C 7/04* (2013.01)

(58) Field of Classification Search
CPC ......... B05D 1/18; B05D 3/0209; B05D 3/107
See application file for complete search history.

(56) References Cited

U.S. PATENT DOCUMENTS

| | | |
|---|---|---|
| 3,408,429 A | 10/1968 | Wichterle |
| 4,136,250 A | 1/1979 | Mueller |

(Continued)

FOREIGN PATENT DOCUMENTS

| | | |
|---|---|---|
| EP | 0632329 A1 | 1/1995 |
| EP | 1465931 B1 | 8/2007 |

*Primary Examiner* — Dah-Wei D. Yuan
*Assistant Examiner* — Kristen A Dagenais-Englehart
(74) *Attorney, Agent, or Firm* — Jian Zhou

(57) ABSTRACT

The invention is generally related to a method for producing, in a consistent manner, contact lenses each having an intact durable coating thereon, wherein the coating is a hydrogel coating formed by covalently attached a hydrophilic polymeric material having azetidinium groups onto a base coating of a polyanionic polymer on a contact lens at a relatively low temperature (e.g., from about 40° C. to about 60° C.). The coating temperature for forming a durable hydrogel coating on top of the base coating of a contact lens can be significantly lowered by raising, in situ, the pH (to about 9.5 or higher) of a reactive coating solution which contains the hydrophilic polymeric material having azetidinium groups.

20 Claims, 1 Drawing Sheet

(56) References Cited

U.S. PATENT DOCUMENTS

| | | |
|---|---|---|
| 4,153,641 A | 5/1979 | Deichert et al. |
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek et al. |
| 4,327,203 A | 4/1982 | Deichert et al. |
| 4,341,889 A | 7/1982 | Deichert et al. |
| 4,343,927 A | 8/1982 | Chang |
| 4,347,198 A | 8/1982 | Ohkada et al. |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,684,538 A | 8/1987 | Klemarczyk |
| 4,703,097 A | 10/1987 | Wingler et al. |
| 4,833,218 A | 5/1989 | Lee |
| 4,837,289 A | 6/1989 | Mueller et al. |
| 4,954,586 A | 9/1990 | Toyoshima et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson et al. |
| 5,079,319 A | 1/1992 | Mueller |
| 5,346,946 A | 9/1994 | Yokoyama et al. |
| 5,358,995 A | 10/1994 | Lai et al. |
| 5,387,632 A | 2/1995 | Lai et al. |
| 5,416,132 A | 5/1995 | Yokoyama et al. |
| 5,449,729 A | 9/1995 | Lai |
| 5,451,617 A | 9/1995 | Lai et al. |
| 5,486,579 A | 1/1996 | Lai et al. |
| 5,508,317 A | 4/1996 | Mueller |
| 5,583,163 A | 12/1996 | Mueller |
| 5,583,463 A | 12/1996 | Merritt |
| 5,665,840 A | 9/1997 | Poehlmann et al. |
| 5,712,356 A | 1/1998 | Bothe et al. |
| 5,760,100 A | 6/1998 | Nicolson et al. |
| 5,789,464 A | 8/1998 | Mueller |
| 5,843,346 A | 12/1998 | Morrill |
| 5,849,810 A | 12/1998 | Mueller |
| 5,849,841 A | 12/1998 | Muehlebach et al. |
| 5,858,937 A | 1/1999 | Richard |
| 5,894,002 A | 4/1999 | Boneberger et al. |
| 5,962,548 A | 10/1999 | Vanderlaan et al. |
| 5,981,675 A | 11/1999 | Valint et al. |
| 6,039,913 A | 3/2000 | Hirt et al. |
| 6,165,408 A | 12/2000 | Steinmann |
| 6,218,508 B1 | 4/2001 | Kragh et al. |
| 6,221,303 B1 | 4/2001 | Steinmann |
| 6,303,687 B1 | 10/2001 | Mueller |
| 6,367,929 B1 | 4/2002 | Maiden et al. |
| 6,472,489 B1 | 10/2002 | Stockinger |
| 6,479,587 B1 | 11/2002 | Stockinger et al. |
| 6,492,478 B1 | 12/2002 | Steinmann |
| 6,627,124 B1 | 9/2003 | Herbrechtsmeier et al. |
| 6,762,264 B2 | 7/2004 | Kuenzler et al. |
| 6,800,225 B1 | 10/2004 | Hagmann et al. |
| 6,822,016 B2 | 11/2004 | McCabe et al. |
| 6,851,805 B2 | 2/2005 | Blum et al. |
| 6,867,245 B2 | 3/2005 | Iwata et al. |
| 6,995,192 B2 | 2/2006 | Phelan |
| 7,052,131 B2 | 5/2006 | McCabe et al. |
| 7,091,283 B2 | 8/2006 | Mueller et al. |
| 7,214,809 B2 | 5/2007 | Zanini et al. |
| 7,238,750 B2 | 7/2007 | Mueller et al. |
| 7,249,848 B2 | 7/2007 | Laredo et al. |
| 7,268,189 B2 | 9/2007 | Mueller et al. |
| 7,268,198 B2 | 9/2007 | Kunzler |
| 7,384,590 B2 | 6/2008 | Kelly et al. |
| 7,387,759 B2 | 6/2008 | Kelly et al. |
| 7,423,074 B2 | 9/2008 | Lai |
| 7,490,936 B2 | 2/2009 | Blum et al. |
| 7,521,519 B1 | 4/2009 | Hirt et al. |
| 7,540,609 B2 | 6/2009 | Chen |
| 7,572,841 B2 | 8/2009 | Chen |
| 7,605,190 B2 | 10/2009 | Moszner et al. |
| 7,750,079 B2 | 7/2010 | Almond |
| 7,915,323 B2 | 3/2011 | Awasthi et al. |
| 7,934,830 B2 | 5/2011 | Blackwell |
| 7,977,430 B2 | 7/2011 | Devlin et al. |
| 8,154,804 B2 | 4/2012 | McGinn et al. |
| 8,231,218 B2 | 7/2012 | Hong |
| 8,367,746 B2 | 2/2013 | Manesis et al. |
| 8,383,744 B2 | 2/2013 | Justynska |
| 8,415,405 B2 | 4/2013 | Maggio |
| 8,420,711 B2 | 4/2013 | Awasthi et al. |
| 8,445,614 B2 | 5/2013 | Francis |
| 8,475,529 B2 | 7/2013 | Clarke |
| 8,480,227 B2 | 7/2013 | Qiu et al. |
| 8,481,662 B2 | 7/2013 | Liu |
| 8,487,058 B2 | 7/2013 | Liu |
| 8,513,325 B2 | 8/2013 | Liu |
| 8,529,057 B2 | 9/2013 | Qiu et al. |
| 8,614,261 B2 | 12/2013 | Iwata et al. |
| 8,642,712 B2 | 2/2014 | Chang |
| 8,658,748 B2 | 2/2014 | Liu |
| 8,703,891 B2 | 4/2014 | Broad |
| 8,820,928 B2 | 9/2014 | Back |
| 8,865,789 B2 | 10/2014 | Yao |
| 8,937,110 B2 | 1/2015 | Alli |
| 8,937,111 B2 | 1/2015 | Alli |
| 8,993,651 B2 | 3/2015 | Chang et al. |
| 9,057,821 B2 | 6/2015 | Broad |
| 9,057,822 B2 | 6/2015 | Liu |
| 9,097,840 B2 | 8/2015 | Chang |
| 9,103,965 B2 | 8/2015 | Chang |
| 9,121,998 B2 | 9/2015 | Chen |
| 9,125,808 B2 | 9/2015 | Alli |
| 9,127,099 B2 | 9/2015 | Iwakiri |
| 9,140,825 B2 | 9/2015 | Alli |
| 9,140,908 B2 | 9/2015 | Ge |
| 9,156,934 B2 | 10/2015 | Alli |
| 9,164,298 B2 | 10/2015 | Hong |
| 9,170,349 B2 | 10/2015 | Mahadevan |
| 9,188,702 B2 | 11/2015 | Vanderlaan |
| 9,217,813 B2 | 12/2015 | Liu |
| 9,296,159 B2 | 3/2016 | Zheng |
| 9,322,959 B2 | 4/2016 | Ueyama |
| 9,322,960 B2 | 4/2016 | Broad |
| 9,360,594 B2 | 6/2016 | Liu |
| 9,475,827 B2 | 10/2016 | Chang |
| 9,529,119 B2 | 12/2016 | Imafuku |
| 10,081,697 B2 | 9/2018 | Huang |
| 11,099,300 B2 * | 8/2021 | Qiu ........................ G02B 1/043 |
| 2008/0015315 A1 | 1/2008 | Chang |
| 2008/0143003 A1 | 6/2008 | Phelan |
| 2008/0143958 A1 | 6/2008 | Medina |
| 2008/0231798 A1 | 9/2008 | Zhou |
| 2008/0234457 A1 | 9/2008 | Zhou |
| 2012/0026457 A1 | 2/2012 | Qiu |
| 2012/0088843 A1 | 4/2012 | Chang |
| 2012/0088844 A1 | 4/2012 | Kuyu |
| 2012/0244088 A1 | 9/2012 | Saxena |
| 2012/0245249 A1 | 9/2012 | Saxena |
| 2013/0337160 A1 | 12/2013 | Holland |
| 2015/0166205 A1 | 6/2015 | Qiu |
| 2016/0061995 A1 | 3/2016 | Chang |
| 2016/0326046 A1 | 11/2016 | Quinter |
| 2017/0068019 A1 | 3/2017 | Qian |
| 2017/0165932 A1 | 6/2017 | Qian |
| 2018/0100038 A1 | 4/2018 | Jing |
| 2018/0100053 A1 | 4/2018 | Jing |
| 2018/0120590 A1 | 5/2018 | Bothe |
| 2018/0355112 A1 | 12/2018 | Zhang |
| 2018/0356562 A1 | 12/2018 | Wu |

* cited by examiner

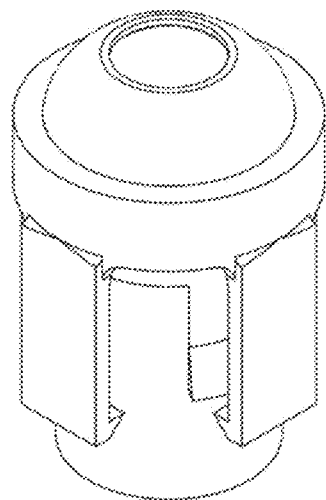
A
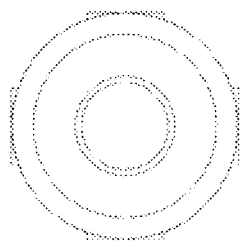
B
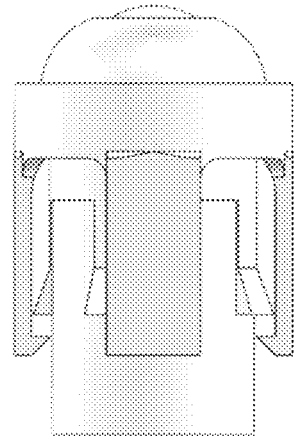
C
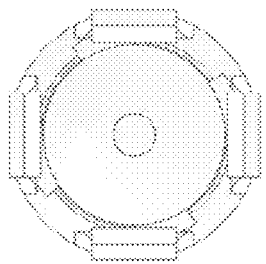
D
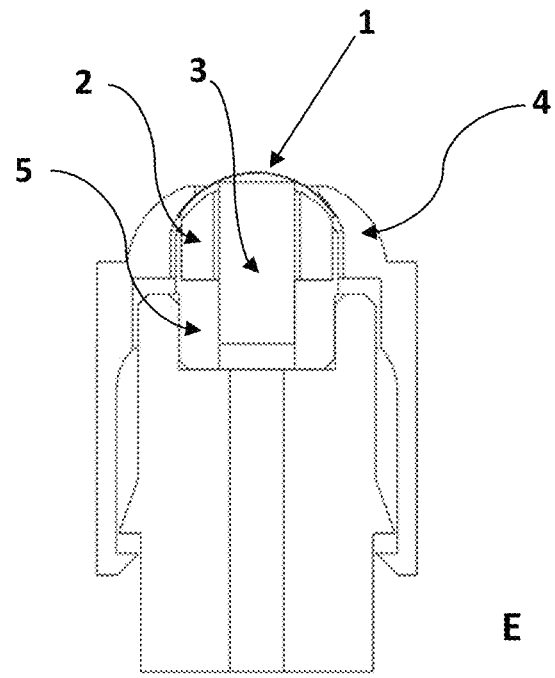
E

METHOD FOR PRODUCING COATED CONTACT LENSES

This application claims the benefits under 35 USC § 119 (e) of U.S. provisional application No. 62/831,876 filed 10 Apr. 2019, herein incorporated by reference in its entirety.

The present invention generally relates to a method for producing contact lenses having a stable and intact coating thereon. In addition, the present invention provides contact lenses produced according to the method of the invention.

BACKGROUND

A new class of soft contact lenses, water gradient silicone hydrogel contact lenses, have been developed and successfully introduced as daily-disposable contact lenses, DAILIES® TOTAL1® (Alcon) in the market. This new class of silicone hydrogel contact lenses is characterized by having a water-gradient structural configuration, an increase from 33% to over 80% water content from core to surface (U.S. Pat. No. 8,480,227). This unique design can deliver a highly-lubricious and extremely-soft, water-rich lens surface that in turn provide superior wearing comfort to patients. Such soft contact lenses can be produced according to a cost-effective approach that is described in U.S. Pat. No. 7,529,057 and involves a step of crosslinking and covalently attaching of a water-soluble highly-branched hydrophilic polymeric material onto lens surfaces to form surface gels.

According to U.S. Pat. No. 8,529,057, contact lenses having a water-gradient structural configuration and a soft, water-rich, and lubricious surface can be produced by forming an anchoring layer on each contact lens by dipping the contact lenses in a coating solution of a polyanionic polymer and then covalently attaching a water-soluble highly-branched hydrophilic polymeric material onto the anchoring layer directly in a lens package during autoclave. The water-soluble highly-branched hydrophilic polymeric material is prepared by partially reacting a polyamidoamine-epichlorohydrin (PAE) with a wetting agent, at various concentration ratio of PAE to the wetting agent and at a reaction temperature for a given reaction time, to achieve a desired lubricity of the surface gels while minimizing or eliminating surface defects (e.g., surface cracking, etc.).

However, a coating process of U.S. Pat. No. 8,529,057 typically involve a high-temperature step (e.g., autoclave temperature at about 121° C.) for forming a durable coating on a silicone contact lens. Such a process may not be suitable for producing contact lenses containing electro-optic elements embedded therein as proposed in U.S. Pat. Nos. 6,851,805, 7,490,936 and 8,154,804, because those electro-optic elements may be susceptible to damages at a temperature greater than 50° C. It would be desirable to have a process of forming a durable coating at a relatively-low temperature.

Therefore, there is still a need for an improved coating process for forming a durable coating on a contact lens at a relatively-low temperature.

SUMMARY OF THE INVENTION

The invention provides a method for producing coated contact lenses each having a hydrogel coating thereon, the method of invention comprising the steps of: (1) obtaining a preformed contact lens; (2) forming a base coating on the preformed contact lens according to a solution-based coating process to form a treated contact lens having the base coating thereon, wherein the solution-based coating process comprises contacting the preformed contact lens with a coating solution for a first period of time at a first temperature of from about 20° C. to about 65° C., wherein the coating solution has a first pH and the first temperature and comprises from about 0.001% to about 5.0% by weight of a polyanionic polymer, wherein the polyanionic polymer is a homo- or copolymer of acrylic acid or $C_1$-$C_3$ alkylacrylic acid, wherein the first pH is from 0 to about 4.5; (3) rinsing the treated contact lens obtained in step (2) with water or an aqueous solution having a second pH of from about 6.0 to about 8.0 for a second period of time at a second temperature which is not higher than the first temperature; and (4) forming a coated contact lens have a hydrogel coating thereon by contacting the treated contact lens obtained in step (3) with an aqueous reactive coating solution at a third temperature of from about 40° C. to about 65° C. for a third period of time, wherein the aqueous has a third temperature of about 30° C. or lower, a third pH of about 8.0 or less, and at least one ophthalmic salt at a concentration of at least 20 mM, wherein the aqueous reactive coating solution has a third pH of at least about 9.5 and comprises a water-soluble, thermally-crosslinkable hydrophilic polymeric material having azetidinium groups; wherein the coated silicone hydrogel contact lens having the hydrogel coating thereon can pass Sudan Black staining test after simulated abrasion cycling treatment.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

BRIEF DESCRIPTION OF THE DRAWINGS

FIG. 1 schematically illustrates a lens holder for performing the simulated abrasion cycling treatment of a lens in order to determine the long-lasting lubricity and/or long-lasting wettability of a contact lens of the invention: A—Perspective view; B—Top view; C—Side view; D—Bottom view; and E—sectional view.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a hard lens, a rigid gas permeable lens, a soft lens, a hybrid lens, a rigid-insert-containing contact lens.

A "hard contact lens" refers a contact lens comprising a hard plastics (e.g., polymethylmethacrylate) as bulk (core) material.

A "rigid gas permeable contact lens" refers to a contact lens comprising a gas permeable material (e.g., a material made from fluorosilicone acrylates) as bulk (core) material.

A soft contact lens can be a non-silicone hydrogel lens, a silicone hydrogel lens or a silicone lens. A "hydrogel contact lens" refers to a contact lens comprising a non-silicone hydrogel bulk (core) material. A "silicone hydrogel contact lens" refers to a contact lens comprising a silicone hydrogel bulk (core) material. A "silicone contact lens" refers to a contact lens made of a crosslinked silicone material as its bulk (or core or base) material which has three-dimensional polymer networks (i.e., polymer matrix), is insoluble in water, and can hold less than about 7.5% (preferably less than about 5%, more preferably less than about 2.5%, even more preferably less than about 1%) by weight of water when fully hydrated.

A hybrid contact lens has a central optical zone that is made of a gas permeable lens material, surrounded by a peripheral zone made of silicone hydrogel or regular hydrogel lens material.

A rigid-insert-containing contact lens refers to a hydrogel or silicone hydrogel contact lens which comprises a hydrogel or silicone hydrogel material as bulk material of the contact lens and at least one rigid insert which is made of a rigid material and encapsulated by the hydrogel or silicone hydrogel material, wherein the rigid material has an elastic modulus of at least about 4.0 MPa. In accordance with the invention a rigid insert can be an electro-optic element, a piece of a rigid gas permeable material, or a combination thereof.

A "hydrogel" or "hydrogel material" refers to a crosslinked polymeric material which is insoluble in water, but can hold at least 10 percent by weight of water in its three-dimensional polymer networks (i.e., polymer matrix) when it is fully hydrated and which has an elastic modulus of about 2.0 MPa or less.

As used in this application, the term "non-silicone hydrogel" refers to a hydrogel that is theoretically free of silicon.

As used in this application, the term "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.05% by weight at room temperature (i.e., 25±3° C.).

The term "insoluble", in reference to a compound or material in a solvent, means that the compound or material can be dissolved in the solvent to give a solution with a concentration of less than 0.005% by weight at room temperature (as defined above).

As used in this application, the term "ethylenically unsaturated group" is employed herein in a broad sense and is intended to encompass any groups containing at least one >C=C< group. Exemplary ethylenically unsaturated groups include without limitation (meth)acryloyl

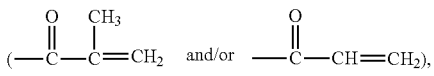

allyl, vinyl, styrenyl, or other C=C containing groups.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

A "blending vinylic monomer" refers to a vinylic monomer capable of dissolving both hydrophilic and hydrophobic polymerizable components of a polymerizable composition to form a solution.

An "acrylic monomer" refers to a vinylic monomer having one sole (meth)acryloyl group.

An "N-vinyl amide monomer" refers to an amide compound having a vinyl group (—CH=CH$_2$) that is directly attached to the nitrogen atom of the amide group.

A "macromer" or "prepolymer" refers to a compound or polymer comprising ethylenically unsaturated groups and having a number average molecular weight of greater than 700 Daltons.

As used in this application, the term "vinylic crosslinker" refers to a compound having at least two ethylenically unsaturated groups. A "vinylic crosslinking agent" refers to a subclass of vinylic crosslinkers each having a number average molecular weight of 700 Daltons or less.

As used in this application, the term "polymer" means a material formed by polymerizing or crosslinking one or more monomers, macromers, prepolymers and/or combinations thereof.

As used in this application, the term "molecular weight" of a polymeric material (including monomeric or macromeric materials) refers to the number average molecular weight unless otherwise specifically noted or unless testing conditions indicate otherwise.

A "polysiloxane segment" refers to a polymer chain consisting of at least three consecutively- and directly-linked siloxane units (divalent radical) each independent of one another having a formula

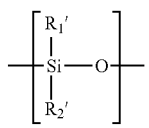

of in which $R_1'$ and $R_2'$ are two substituents independently selected from the group consisting of $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-$(OC_2H_4)_{\gamma1}$—$OR^o$ (in which alk is $C_1$-$C_6$ alkyl diradical, $R^o$ is H or $C_1$-$C_4$ and $\gamma1$ is an integer from 1 to 10), a $C_2$-$C_{40}$ organic radical having at least one functional group selected from the group consisting of hydroxyl group (—OH), carboxyl group (—COOH), —$NR_3'R_4'$, amino linkages of —$NR_3'$—, amide linkages of —$CONR_3'$—, amide of —$CONR_3'R_4'$, urethane linkages of —OCONH—, and $C_1$-$C_4$ alkoxy group, or a linear hydrophilic polymer chain, in which $R_3'$ and $R_4'$ independent of each other are hydrogen or a $C_1$-$C_{15}$ alkyl.

A "polysiloxane vinylic monomer" refers to a compound comprising at least one polysiloxane segment and one sole ethylenically-unsaturated group.

A "polysiloxane vinylic crosslinker" refers to a compound comprising at least one polysiloxane segment and at least two ethylenically-unsaturated groups.

A "chain-extended polysiloxane vinylic crosslinker" refers to a compound comprising at least two ethylenically-unsaturated groups and at least two polysiloxane segments each pair of which is linked by one divalent radical.

A "polycarbosiloxane" refers to a compound containing at least one polycarbosiloxane segment which is a polymer chain consisting of at least three consecutively- and directly-linked siloxane units (divalent radical) each independent of one another having a formula of

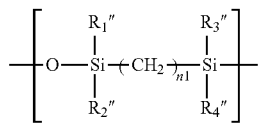

in which n1 is an integer of 2 or 3, $R_1''$, $R_2''$, $R_3''$, and $R_4''$ independent of one another are a $C_1$-$C_6$ alkyl radical (preferably methyl).

A "polycarbosiloxane vinylic monomer" refers to a compound comprising at least one polycarbosiloxane segment and one sole ethylenically-unsaturated group.

A "polycarbosiloxane vinylic crosslinker" refers to a compound comprising at least one polycarbosiloxane segment and at least two ethylenically-unsaturated groups.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater in the range between 400 to 700 nm).

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

As used in this application, the term "amino group" refers to a primary or secondary amino group of formula —NHR', where R' is hydrogen or a $C_1$-$C_{20}$ unsubstituted or substituted, linear or branched alkyl group, unless otherwise specifically noted.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, an "oxazoline" refers to a compound of

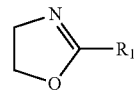

in which: $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—$OR''$ in which alk is $C_1$-$C_4$ alkyl diradical; $R''$ is $C_1$-$C_4$ alkyl (preferably methyl); and m3 is an integer from 1 to 10 (preferably 1 to 5).

In this application, the term "polyoxazoline" refers to a polymer or polymer segment of

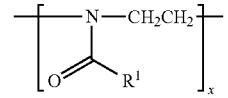

in which: $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—$OR''$ in which alk is $C_1$-$C_4$ alkyl diradical; $R''$ is $C_1$-$C_4$ alkyl (preferably methyl); m3 is an integer from 1 to 10 (preferably 1 to 5); x is an integer from 5 to 500.

In this application, the term "poly(2-oxazoline-co-ethyleneimine)" refers to a statistical copolymer or a polymer segment thereof having a formula of

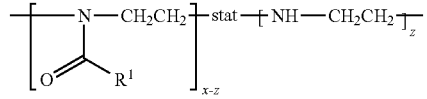

in which: $R^1$ is hydrogen, methyl, ethyl, N-pyrrolidonylmethyl, N-pyrrolidonylethyl, N-pyrrolidonylpropyl, or a monovalent radical of -alk-(OC$_2$H$_4$)$_{m3}$—OR" in which alk is C$_1$-C$_4$ alkyl diradical; R" is C$_1$-C$_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (≥90%) of the secondary amine groups of the poly(2-oxazoline-co-ethyleneimine) into azetidinium groups. Examples of poly (2-oxazoline-co-ethyleneimine)-epichlorohydrin are disclosed in U.S. pat. Appl. No. 2016/0061995A1.

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

In this application the term "azetidinium" or "3-hydroxyazetidinium" refers to a positively-charged (i.e., cationic), divalent radical (or group or moiety) of

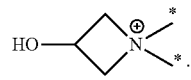

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same cross-linking reaction (or coupling reaction) with another material or functional group at a temperature of from about 5° C. to about 15° C., to an extend detectable for a period of about one hour.

The term "azlactone" refers to a mono-valent radical of formula

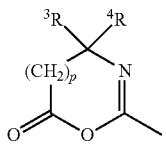

in which p is 0 or 1; $^3$R and $^4$R independently of each other is C$_1$-C$_8$ alkyl (preferably methyl).

The term "aziridine group" refers to a mono-valent radical of formula

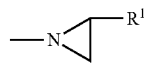

in which R1 is hydrogen, methyl or ethyl.

As used in this application, the term "phosphorylcholine" refers to a zwitterionic group of

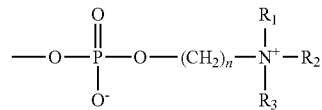

in which n is an integer of 1 to 5 and R$_1$, R$_2$ and R$_3$ independently of each other are C$_1$-C$_8$ alkyl or C$_1$-C$_8$ hydroxyalkyl.

As used in this application, the term "reactive vinylic monomer" refers to any vinylic monomer having at least one reactive functional group selected from the group consisting of carboxyl group, primary amino group, and secondary amino group.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

The intrinsic "oxygen permeability", Dk$_i$, of a material is the rate at which oxygen will pass through a material. As used in this application, the term "oxygen permeability (Dk)" in reference to a hydrogel (silicone or non-silicone) or a contact lens means a corrected oxygen permeability (Dk$_c$) which is measured at about 34-35° C. and corrected for the surface resistance to oxygen flux caused by the boundary layer effect according to the procedures described in Example 1 of U.S. patent application publication No. 2012/0026457 A1. Oxygen permeability is conventionally expressed in units of barrers, where "barrer" is defined as [(cm$^3$ oxygen)(mm)/(cm$^2$)(sec)(mm Hg)]×10$^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as [(cm$^3$ oxygen)/(cm$^2$)(sec)(mm Hg)]×10$^{-9}$.

"Ophthalmically compatible", as used herein, refers to a material or surface of a material which may be in intimate contact with the ocular environment for an extended period of time without significantly damaging the ocular environment and without significant user discomfort.

The term "ophthalmically safe" with respect to a packaging solution for sterilizing and storing contact lenses is meant that a contact lens stored in the solution is safe for direct placement on the eye without rinsing after autoclave and that the solution is safe and sufficiently comfortable for daily contact with the eye via a contact lens. An ophthalmically-safe packaging solution after autoclave has a tonicity and a pH that are compatible with the eye and is substantially free of ocularly irritating or ocularly cytotoxic materials according to international ISO standards and U.S. FDA regulations.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

As used in this application, the term "equilibrium water content" in reference to a contact lens or a polymeric material means the amount (expressed as percent by weight) of water present in the contact lens or the polymeric material when being fully hydrated (equilibrated) in saline solution (ca. 0.79 wt % NaCl) and determined at room temperature (as defined above).

As used in this application, the term "crosslinked coating" or "hydrogel coating" or "hydrogel layer" on a contact lens interchangeably is used to describe a crosslinked polymeric material having a three-dimensional network that can contain water when fully hydrated. The three-dimensional network of a crosslinked polymeric material can be formed by crosslinking of two or more linear or branched polymers through crosslinkages.

"Surface hydrophilicity," as used herein, describes a surface property that represents the extent to which a surface interacts with water, as measured by water-break-up-time (WBUT). The higher the value of WBUT is, the higher the surface hydrophilicity is.

In accordance with the invention, the "surface lubricity" or "lubricity" of a contact lens (or a medical device) is measured by a friction rating which is a number from 0 to 4. The higher the value of friction rating is, the lower the surface lubricity is.

A "water contact angle" refers to an average water contact angle (i.e., contact angles measured by Sessile Drop method) at the room temperature, which is obtained by averaging measurements of contact angles with at least 3 individual contact lenses (or medical devices).

The term "intactness" in reference to a coating on a silicone contact lens (or a medical device) is intended to describe the extent to which the contact lens (or medical device) can be stained by Sudan Black in a Sudan Black staining test described in Example 1. Good intactness of the coating on a silicone contact lens (or a medical device) means that there is practically no Sudan Black staining of the contact lens (or the medical device).

As used in this application, the term "long-lasting surface hydrophilicity and wettability" in reference to a contact lens means that the contact lens has a water-break-up time (WBUT) of at least 10 seconds after 30 cycles of digital rubbing treatment or after simulated abrasion cycling treatment. WBUT determination, cycle of digital rubbing treatment, and simulated abrasion cycling treatment of a contact lens are performed according to the procedures described in Example 1.

As used in this application, the term "long-lasting lubricity" in reference to a contact lens means that the contact lens has a friction rating of about 2.0 or lower after 30 cycles of digital rubbing treatment or after simulated abrasion cycling treatment. Friction rating determination, cycle of digital rubbing treatment, and simulated abrasion cycling treatment of a contact lens are performed according to the procedures described in Example 1.

As used in this application, the term "durability" or "durable" in reference to a hydrogel coating on a coated contact lens or to a coated contact lens having a hydrogel coating thereon means that the hydrogel coating on the coated contact lens remains intact as shown by having no Sudan Black staining in Sudan Black stain test carried out after the coated contact lens has been subjected to 30 cycles of digital rubbing treatment or after simulated abrasion cycling treatment. Sudan Black Stain test is carried out according to the procedures described in Example 1.

As used in this application, the term "pass Sudan Black staining test" in reference to a coated contact lens having a hydrogel coating thereon means that when being subjected to Sudan Black Stain test, the coated contact lens having a hydrogel coating thereon is free of staining under a naked eye's observation.

As used in this application, the term "30 cycles of digital rubbing treatment" or "n cycles of digital rubbing treatment" means that contact lenses are subjected to 30 or n repetitions of a digital rubbing procedure which essentially consists of digitally rubbing (wearing disposable powder-free latex gloves) contact lenses with RENU® multi-purpose lens care solution (or an equivalent, e.g., a multi-purpose lens care solution disclosed in Table I of U.S. Pat. No. 5,858,937 for 20 seconds and then rinsing the digitally-rubbed contact lenses with a phosphate-buffered saline for at least 20 seconds. The 30 or n cycles of digital rubbing treatment can reasonably imitate daily cleaning and disinfecting in a 30-day or n-day lens care regime.

In accordance with the invention, WBUT and $WCA_{cb}$ are measured according to the procedures described in Example 1.

An "aqueous solution" refers to a solution which is a homogeneous mixture consisting of water as solvent and one or more solutes dissolved in water.

The invention is generally related to a method for producing, in a consistent manner, contact lenses each having an intact durable coating thereon, wherein the coating is a hydrogel coating formed by covalently attached a hydrophilic polymeric material having azetidinium groups onto a base coating of a polyanionic polymer on a contact lens at a relatively low temperature (e.g., from about 40° C. to about 60° C.). This invention is partly based on the discovery that the coating temperature for forming a durable hydrogel coating on a contact lens with a base coating (of a polyanionic polymer) thereon can be significantly lowered by raising the pH to about 9.5 or higher of a reactive coating solution which contains the hydrophilic polymeric material having azetidinium groups and which is used for forming the durable hydrogel coating on top of the base coating.

It is believed that for a given reactivity of azetidinium groups with reactive functional groups (e.g., carboxyl groups), there is a correlation between the temperature and the pH of the reaction medium. The higher the pH of the reaction medium is, the lower the temperature for achieving a given reactivity of azetidinium groups is. It is found that when the pH is about 9.5 or higher, the reactivity of azetidinium groups with reactive functional groups, such as carboxyl groups, can be sufficiently high and enable the hydrophilic polymeric material having azetidinium groups to be crosslinked and covalently attached onto the base coating to a certain degree to form a durable hydrogel coating. However, if a reactive coating solution comprising a hydrophilic polymeric material having azetidinium groups has such a high pH, the hydrophilic polymeric material having azetidinium groups could be crosslinked in the reactive coating solution even before it is in contact with a contact lens having a base coating thereon, losing its ability to form a hydrogel coating on top of the base coating on a contact lens. By raising, in-situ or, the pH of the reactive coating solution in the presence of a contact lens having a base coating thereon immersed therein, one can ensure the formation of a durable hydrogel coating on a contact lens.

The invention provides a method for producing coated contact lenses each having a hydrogel coating thereon. The method of invention comprises the steps of: (1) obtaining a preformed contact lens; (2) forming a base coating on the preformed contact lens according to a solution-coating process to form a treated contact lens having the base coating thereon, wherein the solution-coating process comprises contacting the preformed contact lens with a coating solution for a first period of time at a first temperature of from about 20° C. to about 65° C. (preferably from about 25° C. to about 60° C., more preferably from about 30° C. to about 55° C.), wherein the coating solution has a first pH and the first temperature and comprises from about 0.001% to about 5.0% (preferably from about 0.005% to about 3.0%, more preferably from about 0.01% to about 2.5%, even more preferably from about 0.02% to about 2.0%) by weight of a polyanionic polymer, wherein the polyanionic polymer is a homo- or copolymer of acrylic acid or $C_1$-$C_3$ alkylacrylic acid, wherein the first pH is from 0 to about 4.5 (preferably from about 0.5 to about 4.0, more preferably from about 0.5 to about 3.5, even more preferably from about 1.0 to about 3.0); (3) rinsing the treated contact lens obtained in step (2) with water or an aqueous solution having a second pH of from about 6.0 to about 8.0 for a second period of time at a second temperature which is not higher than the first temperature (preferably at least about 5° C., more preferably at least about 10° C., even more preferably at least about 15° C. lower than the first temperature); and (4) forming a coated contact lens have a hydrogel coating thereon by contacting the treated contact lens obtained in step (3) with an aqueous reactive coating solution at a third temperature of from about 40° C. to about 65° C. for a third period of time, wherein the aqueous reactive coating solution has a third pH of at least about 9.5 (preferably from about 9.5 to about 11.0, more preferably from about 9.6 to about 10.7, even more preferably from about 9.8 to about 10.4) and comprises a water-soluble, thermally-crosslinkable hydrophilic polymeric material having azetidinium groups; wherein the coated silicone hydrogel contact lens having the hydrogel coating thereon can pass Sudan Black staining test after simulated abrasion cycling treatment.

In a preferred embodiment, the step of forming a coated contact lens have a hydrogel coating thereon is carried out by: (a) immersing the treated contact lens obtained in step (3) in an aqueous reactive coating solution which has a fourth temperature of about 30° C. or lower (preferably about 28° C. or lower, more preferably about 26° C. or lower, even more preferably about 24° C. or lower) and a fourth pH of about 8.0 or less (preferably from about 6.0 to about 8.0, more preferably from about 6.5 to about 7.8, even more preferably from about 6.8 to about 7.6) and which comprises the water-soluble, thermally-crosslinkable hydrophilic polymeric material having azetidinium groups and at least one ophthalmic salt at a concentration of at least 20 mM; (b) raising the fourth pH to the third pH by adding a base into the aqueous reactive coating solution including the treated contact lens immersed therein; (c) heating the aqueous reactive coating solution including the treated contact lens immersed therein and having the third pH to the third temperature and then maintaining the third temperature for the third period of time to form a coated contact lens have a hydrogel coating thereon.

In another preferred embodiment, the step of forming a coated contact lens have a hydrogel coating thereon is carried out by: (a) immersing the treated contact lens obtained in step (3) in an aqueous reactive coating solution which has a fourth temperature of about 30° C. or lower (preferably about 28° C. or lower, more preferably about 26° C. or lower, even more preferably about 24° C. or lower) and the third pH and which comprises the water-soluble, thermally-crosslinkable hydrophilic polymeric material having azetidinium groups and at least one ophthalmic salt at a concentration of at least 20 mM; (b) heating the aqueous reactive coating solution including the treated contact lens immersed therein and having the third pH to the third temperature and then maintaining the third temperature for the third period of time to form a coated contact lens have a hydrogel coating thereon.

In another preferred embodiment, the step of forming a coated contact lens have a hydrogel coating thereon is carried out by: (a) obtaining an aqueous reactive coating solution which has a fourth temperature of about 30° C. or lower (preferably about 28° C. or lower, more preferably about 26° C. or lower, even more preferably about 24° C. or lower) and a fourth pH of about 8.0 or less (preferably from about 6.0 to about 8.0, more preferably from about 6.5 to about 7.8, even more preferably from about 6.8 to about 7.6) and which comprises the water-soluble, thermally-crosslinkable hydrophilic polymeric material having azetidinium groups and at least one ophthalmic salt at a concentration of at least 20 mM; (b) raising the fourth pH to the third pH by adding a base into the aqueous reactive coating solution; (c) immersing the treated contact lens obtained in step (3) in the aqueous reactive coating solution having the third pH and the fourth temperature within about 1.5 hours or shorter after step (b); and (d) heating the aqueous reactive coating solution including the treated contact lens immersed therein and having the third pH to the third temperature and then maintaining the third temperature for the third period of time to form a coated contact lens have a hydrogel coating thereon.

In accordance with the invention, a preformed contact lens can be any contact lens which has not been subjected to any surface treatment after being produced according to any lens manufacturing processes, any contact lens which has been plasma treated, or any commercial contact lens, so long as it does not have a hydrogel coating thereon. A person skilled in the art knows very well how to make preformed contact lenses. A person skilled in the art knows very well how to make preformed contact lenses. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of polymeric material buttons as used in making customized contact lenses. In cast-molding, a lens formulation (i.e., a polymerizable composition) typically is dispensed into molds and cured (i.e., polymerized and/or crosslinked) in molds for making contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the lens-forming composition is cured actinically under a spatial limitation of actinic radiation to form a contact lens. Examples of preferred reusable molds are those disclosed in U.S. Pat. Nos. 6,627,124, 6,800,225, 7,384,590, and 7,387,759. Reusable molds can be made of quartz, glass, sapphire, $CaF_2$, a cyclic olefin copolymer (e.g., Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, the polymerizable composition can be introduced (dispensed) into a cavity formed by a mold according to any known methods.

After the polymerizable composition is dispensed into the mold, it is polymerized to produce a contact lens. Crosslinking may be initiated thermally or actinically, preferably by exposing the lens-forming composition in the mold to a spatial limitation of actinic radiation to crosslink the polymerizable components in the polymerizable composition.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described below.

In a preferred embodiment, a preformed contact lens is a hard contact lens comprising a hard plastic material as lens bulk material. Preferably, the hard plastic material is a crosslinked polymethylacrylate. A person skilled in the art knows well how to make a hard plastic material, including a crosslinked polymethylmethacrylate.

In another preferred embodiment, a preformed contact lens is a rigid gas permeable contact lens. A person skilled in the art knows how to make a rigid gas permeable contact lens.

In another preferred embodiment, a preformed contact lens is a rigid-insert-containing contact lens which comprises a hydrogel or silicone hydrogel material as bulk material of the contact lens and at least one rigid insert which is made of a rigid material and encapsulated by the hydrogel or silicone hydrogel material, wherein the rigid material has an elastic modulus of at least about 4.0 MPa. The rigid insert can be an electro-optic element, a piece of a rigid gas permeable material, or a combination thereof.

In another preferred embodiment, a preformed contact lens is a hybrid contact lens having a central optical zone made of a rigid gas permeable lens material and surrounded by a peripheral zone made of a hydrogel material.

In another preferred embodiment, a preformed contact lens is a soft silicone contact lens comprising, as lens bulk material, a crosslinked silicone material. Useful crosslinked silicone materials include, without limitation, crosslinked polysiloxanes obtained by crosslinking silicone composition according to any know method, silicone elastomers, silicone rubbers, and the likes. Silicone contact lenses can be prepared by any kind of conventional techniques (for example, the lathe cut manufacturing method, the spin cast manufacturing method, the cast molding manufacturing method, etc.) well-known to a person skilled in the art.

In another preferred embodiment, a preformed contact lens is a non-silicone hydrogel contact lens (or so-called a conventional hydrogel contact lens).

Preformed non-silicone hydrogel contact lenses can be any commercially-available non-silicone hydrogel contact lenses or can be produced according to any known methods. For example, for production of preformed non-silicone hydrogel contact lenses, a non-silicone hydrogel lens formulation for cast-molding or spin-cast molding or for making rods used in lathe-cutting of contact lenses typically is: either (1) a monomer mixture comprising (a) at least one hydrophilic vinylic monomer (e.g., hydroxyethyl methacrylate, glycerol methacrylate, N-vinylpyrrolidone, or combinations thereof) and (b) at least one component selected from the group consisting of a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a high-energy-violet-light ("HEVL") absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof; or (2) an aqueous solution comprising one or more water-soluble prepolymers and at least one component selected from the group consisting of hydrophilic vinylic monomer, a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a HEVL absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof. Resultant preformed hydrogel contact lenses then can be subjected to extraction with an extraction solvent to remove unpolymerized components from the resultant lenses and to hydration process, as known by a person skilled in the art. It is understood that a lubricating agent present in a hydrogel lens formulation can improve the lubricity of preformed hydrogel contact lenses compared to the lubricity of control preformed hydrogel contact lenses obtained from a control hydrogel lens formulation without the lubricating agent.

Examples of water-soluble prepolymers include without limitation: a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192;

derivatives of a polyvinyl alcohol, polyethyleneimine or polyvinylamine, which are disclosed in U.S. Pat. No. 5,849, 841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in U.S. Pat. No. 5,712,356; crosslinkable copolymers of vinyl lactam, vinyl acetate and vinyl alcohol, which are disclosed in U.S. Pat. No. 5,665,840; polyether-polyester copolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489.

Numerous non-silicone hydrogel lens formulations have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A.

In another preferred embodiment, a preformed contact lens is a silicone hydrogel contact lens, preferably a naturally-wettable silicone hydrogel contact lens.

Preformed silicone hydrogel contact lenses can be any commercially-available silicone hydrogel contact lenses or can be produced according to any known methods. For example, for production of preformed silicone hydrogel (SiHy) contact lenses, a SiHy lens formulation for cast-molding or spin-cast molding or for making SiHy rods used in lathe-cutting of contact lenses generally comprises at least one components selected from the group consisting of a silicone-containing vinylic monomer, a silicone-containing vinylic crosslinker, a silicone-containing prepolymer, a hydrophilic vinylic monomer, a hydrophobic vinylic monomer, a non-silicone vinylic crosslinker, a free-radical initiator (photoinitiator or thermal initiator), a silicone-containing prepolymer, and combination thereof, as well known to a person skilled in the art. Resultant preformed SiHy contact lenses then can be subjected to extraction with an extraction solvent to remove unpolymerized components from the resultant lenses and to hydration process, as known by a person skilled in the art. In addition, a preformed SiHy contact lens can be a colored contact lens (i.e., a SiHy contact lens having at least one colored patterns printed thereon as well known to a person skilled in the art).

In accordance with the invention, a silicone-containing vinylic monomer can be any silicone-containing vinylic monomer known to a person skilled in the art. Examples of preferred silicone-containing vinylic monomers include without limitation vinylic monomers each having a bis (trialkylsilyloxy)alkylsilyl group or a tris(trialkylsilyloxy) silyl group, polysiloxane vinylic monomers, polycarbosiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

Examples of preferred vinylic monomers each having a bis(trialkylsilyloxy)alkylsilyl group or a tris(trialkylsilyloxy)silyl group include without limitation tris(trimethylsiloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth) acrylamide, N-(2-hydroxy-3-(3-(bis(trimethylsilyloxy) methylsilyl)propyloxy)propyl)-2-methyl (meth)acrylamide, N-(2-hydroxy-3-(3-(bis(trimethylsilyloxy)methylsilyl)propyloxy)propyl) (meth)acrylamide, N-(2-hydroxy-3-(3-(tris (trimethylsilyloxy)silyl)propyloxy)propyl)-2-methyl acrylamide, N-(2-hydroxy-3-(3-(tris(trimethylsilyloxy)silyl) propyloxy)propyl) (meth)acrylamide, N-[tris (dimethylpropylsiloxy)silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N,N-bis[2-hydroxy-3-(3-(bis(trimethylsilyloxy) methylsilyl)propyloxy)propyl]-2-methyl (meth)acrylamide, N,N-bis[2-hydroxy-3-(3-(bis(trimethylsilyloxy)methylsilyl) propyloxy)propyl] (meth)acrylamide, N,N-bis[2-hydroxy-3-(3-(tris(trimethylsilyloxy)silyl)propyloxy)propyl]-2-methyl (meth)acrylamide, N,N-bis[2-hydroxy-3-(3-(tris(trimethylsilyloxy)silyl)propyloxy)propyl] (meth)acrylamide, N,N-bis [2-hydroxy-3-(3-(tris(trimethylsilyloxy)silyl)propyloxy) propyl] (meth)acrylamide, N-[2-hydroxy-3-(3-(t-butyldimethylsilyl)propyloxy)propyl]-2-methyl (meth (acrylmide), N-[2-hydroxy-3-(3-(t-butyldimethylsilyl) propyloxy)propyl] (meth)acrylamide, N,N-bis[2-hydroxy-3-(3-(t-butyldimethylsilyl)propyloxy)propyl]-2-methyl (meth) acrylamide, N-2-(meth)acryloxyethyl-O-(methyl-bis-trimethylsiloxy-3-propyl)silyl carbamate, 3-(trimethylsilyl) propylvinyl carbonate, 3-(vinyloxycarbonylthio)propyl-tris (trimethyl-siloxy)silane, 3-[tris(trimethylsiloxy)silyl] propylvinyl carbamate, 3-[tris(trimethylsiloxy)silyl] propyl allyl carbamate, 3-[tris(trimethylsiloxy)silyl]propyl vinyl carbonate, those disclosed in U.S. Pat. Nos. 9,097,840, 9,103,965 and 9,475,827, and mixtures thereof. The above preferred silicone-containing vinylic monomers can be obtained from commercial suppliers or can be prepared according to procedures described in U.S. Pat. Nos. 7,214, 809, 8,475,529, 8,658,748, 9,097,840, 9,103,965, and 9,475, 827.

Examples of preferred polysiloxane vinylic monomers include without limitation mono-(meth)acryloyl-terminated, monoalkyl-terminated polysiloxanes of formula (I) include without limitation α-(meth)acryloxypropyl terminated ω-butyl (or ω-methyl) terminated polydimethylsiloxane, α-(meth)acryloxy-2-hydroxypropyloxypropyl terminated ω-butyl (or ω-methyl) terminated polydimethylsiloxane, α-(2-hydroxyl-methacryloxypropyloxypropyl)-ω-butyl-decamethylpentasiloxane, α-[3-(meth)acryloxyethoxy-2-hydroxypropyloxypropyl]-terminated ω-butyl (or ω-methyl) terminated polydimethylsiloxane, α-[3-(meth)acryloxy-propyloxy-2-hydroxypropyloxypropyl]-terminated ω-butyl (or ω-methyl) terminated polydimethylsiloxane, α-[3-(meth) acryloxyisopropyloxy-2-hydroxypropyloxypropyl]-terminated ω-butyl (or ω-methyl) terminated polydimethylsiloxane, α-[3-(meth)acryloxybutyloxy-2-hydroxypropyloxypropyl]-terminated ω-butyl (or ω-methyl) terminated polydimethylsiloxane, α-[3-(meth)acryloxyethylamino-2-hydroxypropyloxypropyl]-terminated ω-butyl (or ω-methyl) terminated polydimethylsiloxane, α-[3-(meth)acryloxypropylamino-2-hydroxypropyloxypropyl]-terminated ω-butyl (or ω-methyl) terminated polydimethylsiloxane, α-[3-(meth)acryloxy-butylamino-2- hydroxypropyloxypropyl]-terminated ω-butyl (or ω-methyl) terminated polydimethylsiloxane, α-[(meth)acryloxy(polyethylenoxy)-2-hydroxypropyloxypropyl]-terminated ω-butyl (or ω-methyl) terminated polydimethylsiloxane, α-[(meth)acryloxy-2-hydroxypropyloxy-ethoxypropyl]-terminated ω-butyl (or ω-methyl) terminated polydimethylsiloxane, α-[(meth)acryloxy-2-hydroxypropyl-N-ethylaminopropyl]-terminated ω-butyl (or ω-methyl) terminated polydimethylsiloxane, α-[(meth)acryloxy-2-hydroxypropyl-aminopropyl]-terminated ω-butyl (or ω-methyl) terminated polydimethylsiloxane, α-[(meth)acryloxy-2-hydroxypropyloxy-(polyethylenoxy)propyl]-terminated ω-butyl (or ω-methyl) terminated polydimethylsiloxane, α-(meth)acryloylamidopropyloxypropyl terminated ω-butyl (or ω-methyl) terminated polydimethylsiloxane, α-N-methyl-(meth)acryloylamidopropyloxypropyl terminated ω-butyl (or ω-methyl) terminated polydimethylsiloxane, α-[3-(meth)acrylamidoethoxy-2-hydroxypropyloxy-propyl]-terminated ω-butyl (or ω-methyl) polydimethylsiloxane, α-[3-(meth)acrylamidopropyloxy-2-hydroxypropyloxypropyl]-terminated ω-butyl (or ω-methyl) terminated polydimethylsiloxane, α-[3-(meth)acrylamidoisopropyloxy-2-hydroxypropyloxypropyl]-terminated ω-butyl (or ω-methyl) terminated polydimethylsiloxane, α-[3-(meth)acrylamidobutyloxy-2-hydroxypropyloxypropyl]-terminated ω-butyl (or ω-methyl) terminated polydimethylsiloxane, α-[3-(meth)acryloylamido-2-hydroxypropyloxypropyl] terminated ω-butyl (or ω-methyl) polydimethylsiloxane, α-[3-[N-methyl-(meth)acryloylamido]-2-hydroxypropyloxypropyl] terminated ω-butyl (or ω-methyl) terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, mono-vinyl carbonate-terminated mono-alkyl-terminated polydimethylsiloxanes, mono-vinyl carbamate-terminated mono-alkyl-terminated polydimethylsiloxane, those disclosed in U.S. Pat. Nos. 9,097,840 and 9,103,965, and mixtures thereof. The above preferred polysiloxanes vinylic monomers can be obtained from commercial suppliers (e.g., Shin-Etsu, Gelest, etc.) or prepared according to procedures described in patents, e.g., U.S. Pat. Nos. 6,867,245, 8,415,405, 8,475,529, 8,614,261, and 9,217,813, or by reacting a hydroxyalkyl (meth)acrylate or (meth)acrylamide or a (meth)acryloxypolyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

Any polycarbosiloxane vinylic monomers can be used in the invention. Examples of preferred polycarbosiloxane vinylic monomers include without limitation those disclosed in U.S. Pat. Nos. 7,915,323 and 8,420,711 and in U.S. Pat. Appl. Pub. Nos. 2012/244088A1 and 2012/245249A1.

Any suitable silicone-containing vinylic crosslinkers can be used in the invention. Examples of preferred silicone-containing vinylic crosslinkers include without limitation polysiloxane vinylic crosslinkers, polycarbosiloxane vinylic crosslinkers, and combinations thereof.

Any suitable polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

Examples of preferred di-(meth)acryloyloxy-terminated polysiloxane vinylic crosslinkers includes without limitation the reaction products of glycidyl methacrylate with di-amino-terminated polydimethylsiloxanes; the reaction products of glycidyl methacrylate with di-hydroxyl-terminatedd polydimethylsiloxanes; the reaction products of isocyantoethyl (meth)acrylate with di-hydroxyl-terminated polydimethylsiloxanes; di-(meth)acryloyloxy-terminated polysiloxane vinylic crosslinkers each having hydrophilized siloxane units each having one methyl substituent and one monovalent $C_4$-$C_{40}$ organic radical substituent having 2 to 6 hydroxyl groups as disclosed in U.S. Pat. No. 10,081,697; chain-extended polysiloxabe vinylic crosslinkers disclosed in US201008843A1 and US20120088844A1; chain-extended polysiloxane vinylic crosslinkers described in U.S. Pat. Nos. 5,034,461, 5,416,132, 5,44,9729, 5,760,100, 7,423,074, and 8,529,057; chain-extended polysiloxane vinylic crosslinkers described in U.S. Pat. App. Pub. No. 2018-0100053; chain-extended polysiloxane vinylic crosslinkers described in U.S. Pat. App. Pub. No. 2018-0100038; chain-extended polysiloxane vinylic crosslinkers described in U.S. Pat. No. 8,993,651; α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-

(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane.

Any polycarbosiloxane vinylic crosslinkers can be used in the invention. Examples of preferred polycarbosiloxane vinylic crosslinkers include without limitation those disclosed in U.S. Pat. Nos. 7,915,323 and 8,420,711 and in U.S. Pat. Appl. Pub. Nos. 2012/0244088 and 2012/0245249.

Any hydrophilic vinylic monomers can be used in the invention. Examples of preferred hydrophilic vinylic monomers are alkyl (meth)acrylamides (as described below), hydroxyl-containing acrylic monomers (as described below), amino-containing acrylic monomers (as described below), carboxyl-containing acrylic monomers (as described below), N-vinyl amide monomers (as described below), methylene-containing pyrrolidone monomers (i.e., pyrrolidone derivatives each having a methylene group connected to the pyrrolidone ring at 3- or 5-position) (as described below), acrylic monomers having a $C_1$-$C_4$ alkoxyethoxy group (as described below), vinyl ether monomers (as described below), allyl ether monomers (as described below), phosphorylcholine-containing vinylic monomers(as described below), N-2-hydroxyethyl vinyl carbamate, N-carboxyvinyl-β-alanine (VINAL), N-carboxyvinyl-α-alanine, and combinations thereof.

Examples of alkyl (meth)acrylamides includes without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of carboxyl-containing acrylic monomers include without limitation 2-(meth)acrylamidoglycolic acid, (meth)acrylic acid, ethylacrylic acid, and combinations thereof.

Examples of preferred N-vinyl amide monomers include without limitation N-vinyl pyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred methylene-containing ($=CH_2$) pyrrolidone monomers include without limitations 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of preferred acrylic monomers having a $C_1$-$C_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof.

Examples of preferred vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of preferred allyl ether monomers include without limitation allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

Examples of preferred phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)acryloyloxy)propyl-2'-(trimethylammonio)ethylphosphate), 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethyl)phosphate, 2-(allyloxycarbonylamino)ethyl-2'-(trirnethylammonio)ethyl phosphate, 2-(butenoyloxy)ethyl-2'-(trimethylammonio)ethylphosphate, and combinations thereof.

In accordance with the invention, any hydrophobic vinylic monomers can be in this invention. Examples of preferred hydrophobic vinylic monomers include methyl (meth)acrylate, ethyl (meth)acrylate, propyl (meth)acrylate, isopropyl (meth)acrylate, cyclohexyl (meth)acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth) acrylate, trifluoroethyl (meth)acrylate, hexafluoro-isopropyl (meth)acrylate, hexafluorobutyl (meth)acrylate, and combinations thereof.

In accordance with the invention, any non-silicone vinylic crosslinkers can be in this invention. Examples of preferred non-silicone vinylic cross-linking agents include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth) acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth) acryloxyethyl] phosphate, trimethylolpropane di-(meth) acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth) acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, and combinations thereof. A preferred non-silicone vinylic cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis (2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329.

Any silicon-containing prepolymers comprising hydrophilic segments and hydrophobic segments can be used in the invention. Examples of such silicone-containing prepolymers include those described in U.S. Pat. Nos. 6,039, 913, 7,091,283, 7,268,189, 7,238,750, 7,521,519, 8,383,744, and 8,642,712; and U.S. Pat. Appl. Pub. Nos. 2008/

0015315A1, 2008/0143958A1, 2008/0143003A1, 2008/0234457A1, 2008/0231798A1.

A SiHy contact lens formulation can also comprise other necessary components known to a person skilled in the art, such as, for example, a UV-absorbing vinylic monomer, a HEVL-absorbing vinylic monomer, a visibility tinting agent (e.g., reactive dyes, polymerizable dyes, pigments, or mixtures thereof, as well known to a person skilled in the art), antimicrobial agents (e.g., preferably silver nanoparticles), a bioactive agent, leachable lubricants, leachable tear-stabilizing agents, and mixtures thereof, as known to a person skilled in the art.

In accordance with a preferred embodiment of the invention, a preformed silicone hydrogel contact lens of the invention can further comprise (but preferably comprises) repeating units of one or more UV-absorbing vinylic monomers and optionally (but preferably) one or more UV/HEVL-absorbing vinylic monomers. The term "UV/HEVL-absorbing vinylic monomer" refers to a vinylic monomer that can absorb UV light and high-energy-violet-light (i.e., light having wavelength between 380 nm and 440 nm.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5-methacrylamidophenyl)-5-chlorobenzotriazole, 2-(2'-hydroxy-5-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3-'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9Cl) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Where a vinylic monomer capable of absorbing ultraviolet radiation and high energy violet light (HEVL) is used in the invention, a Germanium-based Norrish Type I photoinitiator and a light source including a light in the region of about 400 to about 550 nm are preferably used to initiate a free-radical polymerization. Any Germanium-based Norrish Type I photoinitiators can be used in this invention, so long as they are capable of initiating a free-radical polymerization under irradiation with a light source including a light in the region of about 400 to about 550 nm. Examples of Germane-based Norrish Type I photoinitiators are acylgermanium compounds described in U.S. Pat. No. 7,605,190.

The bioactive agent is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N-N-dimethylacrylamide, polyacrylic acid, poly 2 ethyl oxazoline, heparin polysaccharides, polysaccharides, and mixtures thereof. The number average molecular weight $M_n$ of the non-crosslinkable hydrophilic polymer is preferably from 5,000 to 1,000,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

A polymerizable composition (SiHy lens formulation) can be a solventless clear liquid prepared by mixing all polymerizable components and other necessary component or a solution prepared by dissolving all of the desirable components in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction.

A solventless lens SiHy lens formulation typically comprises at least one blending vinylic monomer as a reactive solvent for dissolving all other polymerizable components of the solventless SiHy lens formulation. Examples of preferred blending vinylic monomers include $C_1$-$C_{10}$ alkyl (meth)acrylate (e.g., methyl (meth)acrylate, ethyl (meth)acrylate, propyl (meth)acrylate, isopropyl (meth)acrylate, 2-ethylhexyl (meth)acrylate, pentyl (meth)acrylate, hexyl (meth)acrylate, etc.), cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth) acrylate, hexafluorobutyl (meth)acrylate, or combinations thereof. Preferably, methyl methacrylate is used as a blending vinylic monomer in preparing a solventless SiHy lens formulation.

Any solvents can be used in the invention. Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3, 4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

Numerous SiHy lens formulations have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A.

A SiHy lens formulation (i.e., polymerizable composition) can be cured (polymerized) thermally or actinically as known to a person skilled in the art, preferably in molds for cast molding of contact lenses.

The thermal polymerization is carried out conveniently, for example at a temperature of from 25 to 120° C. and preferably 40 to 100° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

The molded contact lens can be subject to lens extraction to remove unpolymerized polymerizable components. The extraction solvent can be any solvent known to a person skilled in the art. Those solvents described in this application can also be used as extraction solvent. Preferably, the molded contact lens is extracted with water, propylene glycol, polyethylene glycol having a number average molecular weight of 400 Daltons or less, or a mixture of water with propylene glycol or polyethylene glycol having a number average molecular weight of about 400 Daltons or less.

In a preferred embodiment, the preformed contact lens is a commercial SiHy contact lens (any one described above).

In accordance with the invention, the preformed SiHy contact lens has an oxygen permeability of at least about 50, preferably at least about 60, more preferably at least about 70, even more preferably at least about 90 barrers, most preferably at least about 110 Barrers. The preformed SiHy contact lens can also have an equilibrium water content of from about 10% to about 70%, preferably from about 35% to about 70%, more preferably from about 40% to about 65%; even more preferably from about 40% to about 60%, most preferably from about 40% to about 55% by weight.

In accordance any one of the preferred embodiments of the invention, the preformed SiHy contact lens is naturally wettable without being subjected to any post-curing surface treatment. Naturally-wettable preformed SiHy contact lenses are disclosed in U.S. Pat. Nos. 6,367,929, 6,822,016, 7,052,131, 7,249,848, 6,867,245, 7,268,198, 7,540,609, 7,57,2841, 7,750,079, 7,934,830, 8,231,218, 8,367,746, 8,445,614, 8,481,662, 8,487,058, 8,513,325, 8,703,891, 8,820,928, 8,865,789, 8,937,110, 8,937,111, 9,057,821, 9,057,822, 9,121,998, 9,125,808, 9,140,825, 9,140,908, 9,156,934, 9,164,298, 9,170,349, 9,188,702, 9,217,813, 9,296,159, 9,322,959, 9,322,960, 9,360,594, and 9,529,119; and in U.S. patent application Ser. No. 16/000,930 and Ser. No. 16/000,933.

The preformed SiHy contact lens can further have a bulk elastic modulus or bulk Young Modulus (hereinafter the terms, "softness," "elastic modulus," and "Young's modulus" are interchangeably used in this application to mean bulk elastic modulus if the term is not modified by the word "surface.") of from about 0.3 MPa to about 1.8 MPa, preferably from 0.4 MPa to about 1.5 MPa, more preferably from about 0.5 MPa to about 1.2 MPa. A person skilled in the art knows well how to determine the elastic modulus and water content of a SiHy material or a SiHy contact lens. For example, all commercial SiHy contact lenses have reported values of oxygen permeability, elastic modulus and water content.

In accordance with the invention, contacting of a preformed contact lens with any coating solution of a polyanionic polymer can occur by dipping it into the coating solution or by spraying it with the coating solution. One contacting process involves solely dipping the preformed contact lens in a bath of a coating solution for a period of time or alternatively dipping the preformed contact lens sequentially in a series of bath of coating solutions for a fixed shorter time period for each bath. Another contacting process involves solely spray a coating solution. However, a number of alternatives involve various combinations of spraying- and dipping-steps may be designed by a person having ordinary skill in the art.

Any polyanionic polymers (i.e., a polymeric having multiple anionic groups at a neutral pH) can be used in forming a base coating on a preformed contact lens. In accordance with the invention, a polyanionic polymer used in a method of the invention is a homo- or copolymer of acrylic acid, $C_1$-$C_3$ alkylacryllic acid (i.e., methacrylic cid, ethylacrylic acid, propylacrylic acid) or a mixture thereof. Examples of preferred polyanionic polymers include without limitations polyacrylic acid, polymethacrylic acid, poly(ethylacrylic acid), poly(propyacrylic acid), poly(acrylic acid-co-methacrylic acid), poly(acrylic acid-co-ethylacrylic acid), poly(acrylic acid-co-propylacrylic acid), poly[ethylacrylic acid-co-(meth)acrylic acid], poly[propylacrylic acid-co-(meth)acrylic acid], poly[ethylacrylic acid-co-propylacrylic acid], and mixtures thereof. Preferably, a polyanionic polymer is polyacrylic acid, polymethacrylic acid, poly(acrylic acid-co-methacrylic acid), or a mixture thereof.

In accordance with the invention, the weight average molecular weight $M_w$ of a polyanionic polymer for forming a base coating on preformed contact lenses is from about 100,000 to about 10,000,000 Daltons, preferably from about 200,000 to about 5,000,000 Daltons, more preferably from about 300,000 Daltons to about 2,000,000 Daltons.

Any coating solution of any polyanionic polymer used in a solution-coating procedure for forming a base coating on preformed contact lenses can be prepared by dissolving one or more polyanionic polymers in water, a mixture of water and one or more organic solvents miscible with water, an organic solvent, or a mixture of one or more organic solvent. It is believed that a solvent system containing at least one organic solvent can swell a preformed contact lens so that a portion of the polyanionic polymer may penetrate into the preformed contact lens and increase the durability and thickness of the base coating. Any organic solvents described above can be used in preparation of a solution of the polyanionic polymer, so long as it can dissolve the polyanionic polymer. Preferably, the polyanionic polymer is dissolved in water or a mixture of water with propylene glycol or polyethylene glycol having a number average molecular weight of about 400 Daltons or less.

The thickness of the base coating can be adjusted by varying the concentration of the polyanionic polymer, the contacting time of the preformed contact lens with the solution of the polyanionic polymer, the solvent system (e.g., the amount of one or more organic solvents), pH or ionic strength of the solution, or combinations thereof.

The concentration of polyanionic polymer is from about 0.001% to about 5.0%, preferably from about 0.005% to about 3.0%, more preferably from about 0.01% to about 2.5%, even more preferably from about 0.02% to about 2.0% by weight relative to the total weight of the solution.

In accordance with the invention, the pH of any coating solutions (including the first and second coating solutions) used in the solution-coating procedure is from 0 to about 4.5, preferably from about 0.5 to about 4.0, more preferably from about 0.5 to about 3.5, even more preferably from about 1.0 to about 3.0. Such a pH can be achieved in by adding any inorganic or organic acid, preferably sulfuric acid or formic acid, more preferably formic acid, into the coating solution. It is understood that homo- or copolymers of acrylic acid or C2-C3 alkylacrylic acid are presented in fully-protonated form in a solution having such a pH and may easily penetrate partially into a preformed contact lens.

In accordance with the invention, the coating solution has a temperature of from about 20° C. to about 65° C. (preferably from about 25° C. to about 60° C., more preferably from about 30° C. to about 55° C.). Although the inventors do not wish to be bound by any particular theory, it is believed that at a higher temperature, the hydrophobic backbone of a polyanionic polymer may strongly interact with the hydrophobic backbone and/or hydrophobic portions of the polymer matrix of a contact lens on the lens surface and molecules of a polyanionic polymer might be able to be in more close contact with the hydrophobic surface areas of the lens and then "trapped" there once the temperature drops.

In accordance with the invention, the preformed contact lens is in contact with the coating solution for from about 5 minutes to about 240 minutes (preferably from about 5 minutes to about 200 minutes, more preferably from about 10 minutes to about 160 minutes, even more preferably from about 10 minutes to about 120 minutes).

In accordance with the invention, water or any aqueous solution can be used as rinsing solutions in the invention, so long as it has a pH from about 6.0 to about 8.0. It is understood that an aqueous solution can comprise an ophthalmically compatible salt (e.g., NaCl, KCl, a sodium or potassium salt of phosphoric acid, carbonic acid, boric acid, acetic acid, and citric acid), a buffer, a surfactant, or the like. A phosphate-buffered or bicarbonate-buffered saline is used as a rinsing solution. The temperature of water or the aqueous solution is preferably lower than the temperature of the coating solution of the polyanionic polymer for "trapping" the polyanonic polymer in and/or the preformed contact lens.

In accordance with the invention, the treated contact lens can be rinsed for from about 5 minutes to about 240 minutes (preferably from about 5 minutes to about 180 minutes, more preferably from about 10 minutes to about 120 minutes, even more preferably from about 10 minutes to about 60 minutes).

In accordance with the invention, the aqueous reactive coating solution comprises at least one ophthalmically compatible salts and a water-soluble thermally-crosslinkable hydrophilic polymeric material having azetidinium groups.

Any ophthalmicaly compatible salts can be used in the invention. Examples of preferred salts include without limitation NaCl, KCl, sodium and potassium salts of phosphoric acid, carbonic acid, boric acid, acetic acid, and citric acid, and combinations thereof. The concentration of the ophthamically compatible salts is at least 20 mM, preferably at least 25 mM, more prefeably at least 30 mM, even more preferably at least 35 mM.

In accordance with the invention, the thermally-crosslinkable hydrophilic polymeric material having azetidinium groups is required for forming the outer surface hydrogel layer (i.e., the crosslinked hydrophilic coating). Preferably, the water-soluble and crosslinkable hydrophilic polymeric material is a partially-crosslinked polymeric material that comprises a three-dimensional network and preferably thermally-crosslinkable groups, more preferably azetidinium groups within the network or being attached to the network. The term "partially-crosslinked" in reference to a polymeric material means that the crosslinkable groups of starting materials for making the polymeric material in crosslinking reaction have not been fully consumed. For example, such a thermally-crosslinkable hydrophilic polymeric material comprises azetidinium groups and is a partial reaction product of at least one azetidinium-containing polymer with at least one hydrophilicity-enhancing agent (i.e., a wetting agent) having at least one carboxyl, primary amine, secondary amine, or thiol group, according to the crosslinking reactions shown in Scheme I Scheme I

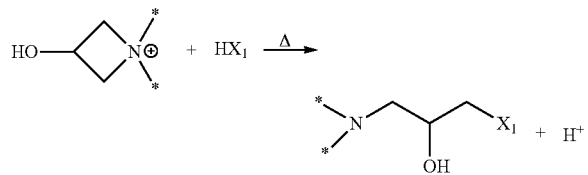

in which $X_1$ is —S—*, —OC(=O)—*, or —NR'—* in which R' in which R' is hydrogen or a $C_1$-$C_{20}$ unsubstituted or substituted alkyl group, and * represents an organic radical.

Any suitable azetidinium-containing polymers can be used in the invention. Examples of azetidinium-containing polymers includes without limitation epichlorohydrin-functionalized polyamines, homopolymers of an azetidinium-containing vinylic monomer, copolymers of an azetidinium-containing vinylic monomer with one or more vinylic monomers.

Preferably, an azetidinium-containing polymer is an epichlorohydrin-functionalized polyamine. An epichlorohydrin-functionalized polyamine can be obtained by reacting epichlorohydrin with a polyamine polymer or a polymer containing secondary amino groups. For example, a poly(alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer; a homopolymer or copolymer of mono-alkylaminoalkyl (meth)acrylate or mono-alkylaminoalkyl (meth)acrylamide can also react with epichlorohydrin to form an epichlorohydrin-functionalized polyamine; a poly(2-oxazoline-co-ethyleneimine) copolymer can react with epichlorohydrin to form an epichlorohydrin-functionalized polyamine (i.e., a poly(2-oxazoline-co-ethyleneimine)-epichlorohydrin). The reaction conditions for epichlorohydrin-functionalization of a polyamine or polyamidoamine polymer are taught in EP1465931. A preferred epichlorohydrin-functionalized polyamine is polyamidoamine-epichlorohydrin (PAE) or a poly(2-oxazoline-co-ethyleneimine)-epichlorohydrin.

Polyamidoamine-epichlorohydrin is commercially available, such as, for example, Kymene® or Polycup® resins (epichlorohydrin-functionalized adipic acid-diethylenetriamine copolymers) from Hercules.

Poly(2-oxazoline-co-ethyleneimine)-epichlorohydrin can be prepared according to procedures described in U.S. Pat. Appl. Pub. No. US 2016/0061995 A1.

Homopolymers and copolymers of an azetidinium-containing vinylic monomer can be obtained according to the procedures described in U.S. Pat. Appl. Pub. No. 2013/0337160A1.

Any suitable hydrophilicity-enhancing agents can be used in the invention so long as they are ophthalmically compatible and contain at least one amino group, at least one carboxyl group, and/or at least one thiol group, preferably contain at least one carboxyl group, at least one thiol group, or combinations thereof.

A preferred class of hydrophilicity-enhancing agents include without limitation: primary amino-, secondary amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); primary amino-, secondary amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and primary amino-, secondary amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more (primary or secondary) amino, carboxyl and/or thiol groups. More preferably, the content of the amino (—NHR' with R' as defined above), carboxyl (—COOH) and/or thiol (—SH) groups in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilic polymers as hydrophilicity-enhancing agents are (primary or secondary) amino- or carboxyl-containing polysaccharides, for example, such as, carboxymethylcellulose (having a carboxyl content of about 40% or less, which is estimated based on the composition of repeating units, —[$C_6H_{10-m}O_5(CH_2CO_2H)_m$]— in which m is 1 to 3), carboxyethylcellulose (having a carboxyl content of about 36% or less, which is estimated based on the composition of repeating units, —[$C_6H_{10-m}O_5$ ($C_2H_4CO_2H)_m$]— in which m is 1 to 3) carboxypropylcellulose (having a carboxyl content of about 32% or less, which is estimated based on the composition of repeating units, —[$C_6H_{10-m}O_5(C_3H_6CO_2H)_m$]—, in which m is 1 to 3), hyaluronic acid (having a carboxyl content of about 11%, which is estimated based on the composition of repeating units, —($C_{13}H_{20}O_9NCO_2H$)—), chondroitin sulfate (having a carboxyl content of about 9.8%, which is estimated based on the composition of repeating units, —($C_{12}H_{18}O_{13}NS\ CO_2H$)—), or combinations thereof.

Another preferred class of hydrophilic polymers as hydrophilicity-enhancing agents include without limitation: poly(ethylene glycol) (PEG) with mono-amino (primary or secondary amino), carboxyl or thiol group (e.g., PEG-NH$_2$, PEG-SH, PEG-COOH); H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino (primary or secondary), carboxyl or thiol groups; PEG dendrimers with one or more amino (primary or secondary), carboxyl or thiol groups; a diamino-(primary or secondary) or dicarboxyl-terminated homo- or co-polymer of a non-reactive hydrophilic vinylic monomer; a monoamino-(primary or secondary) or monocarboxyl-terminated homo- or co-polymer of a non-reactive hydrophilic vinylic monomer; a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer; and combinations thereof.

In accordance with the invention, reactive vinylic monomers can be carboxyl-containing vinylic monomers, primary amino-containing vinylic monomers, or secondary amino-containing vinylic monomers.

Examples of preferred carboxyl-containing vinylic monomers include without limitation acrylic acid, methacrylic ethylacrylic acid, N-2-(meth)acrylamidoglycolic acid, and combinations thereof.

Examples of preferred primary and secondary amino-containing vinylic monomers include without limitation N-2-aminoethyl (meth)acrylamide, N-2-methylaminoethyl (meth)acrylamide, N-2-ethylaminoethyl (meth)acrylamide, N-3-aminopropyl (meth)acrylamide, N-3-methylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, and combinations thereof.

In accordance with the invention, a non-reactive vinylic monomer is a vinylic monomer free of any carboxyl group, primary amino group, secondary amino group, epoxide group, isocyanate group, azlactone group, or aziridine group. Non-reactive vinylic monomers preferably are non-charged hydrophilic vinylic monomers which are free of carboxyl or amino group (any those described above can be used here), phosphorylcholine-containing vinylic monomers (any those described above can be used here), or combinations thereof.

More preferably, a hydrophilic polymer as a hydrophilicity-enhancing agent is:

a poly(ethylene glycol) having one sole functional group of —NH$_2$, —SH or —COOH;

a poly(ethylene glycol) having two terminal functional groups selected from the group consisting of —NH$_2$, —COOH, —SH, and combinations thereof;

a multi-arm poly(ethylene glycol) having one or more functional groups selected from the group consisting of —NH$_2$, —COOH, —SH, and combinations thereof;

a monoamino-, monocarboxyl-, diamino- or dicarboxyl-terminated homo- or copolymer of a non-reactive hydrophilic vinylic monomer;

a copolymer which is a polymerization product of a composition comprising (1) from about 0.1% to about 30%, preferably from about 0.5% to about 20%, more preferably from about 1% to about 15%, by weight of acrylic acid, methacrylic acid, ethylacrylic acid, 2-(meth)acrylamidoglycolic acid, N-2-aminoethyl (meth)acrylamide, N-2-methylaminoethyl (meth)acrylamide, N-2-ethylaminoethyl (meth)acrylamide, N-3-aminopropyl (meth)acrylamide, N-3-methylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-amino-2-hydroxypropyl (meth)acrylate, or a combination thereof, and (2) at least one non-reactive hydrophilic vinylic monomer selected from the group consisting of acryamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof, wherein the non-reactive hydrophilic vinylic monomer selected from the group consisting of selected from the group consisting of alkyl (meth)acrylamides (any one described above), N-2-dimethylaminoethyl (meth)acrylamide, dimethylaminoethyl (meth)acrylate, hydroxyl-containing acrylic monomers (any one described above), N-vinyl amide monomers (any one described above), methylene-containing pyrrolidone monomers (i.e., pyrrolidone derivatives each having a methylene group connected to the pyrrolidone ring at 3- or 5-position) (any one described above), acrylic monomers having a $C_1$-$C_4$ alkoxyethoxy group (any one described above), vinyl ether monomers (any one described above), allyl ether monomers (any one described above), a phosphorylcholine-containing vinylic monomer (any one described above) and combinations thereof (preferably selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)ethylphosphate, 3-[(meth)acryloylamino]propyl-2'-(trimethylammonio)ethylphosphate, 4-[(meth)acryloylamino]butyl-2'-(trimethylammonio)ethylphosphate, (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, 2-hydroxyethyl (meth)acrylate, glycerol methacrylate (GMA), tetra(ethylene glycol) (meth)acrylate, poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, N-vinyl formamide, N-vinyl acetamide, 1-methyl-3-methylene-2-pyrrolidone, 1-methyl-5-methylene-2-pyrrolidone, 5-methyl-3-methylene-2-pyrrolidone, tetra(ethylene glycol) methyl ether (meth)acrylate, methoxypoly(ethylene glycol)ethyl (meth)acrylamide having a number average molecular weight of up to 1500, $C_1$-$C_4$-alkoxy polyethylene glycol (meth)acrylate having a weight average molecular weight of up to 1500, tetra(ethylene glycol) monovinyl ether, poly(ethylene glycol) monovinyl ether, tetra(ethylene glycol) methyl vinyl ether, poly(ethylene glycol) methyl vinyl ether, tetra(ethylene glycol) monoallyl ether, poly(ethylene glycol) monoallyl ether, tetra(ethylene glycol) methyl allyl ether, poly(ethylene glycol) methyl allyl ether, vinyl alcohol, allyl alcohol, and combinations thereof, more preferably selected from the group consisting of (meth)acryloyloxyethyl phosphorylcholine, (meth)acryloyloxypropyl phosphorylcholine, 4-((meth)acrylayloxy)butyl-2"-(trimethylammonio)ethylphosphate, 2-[(meth)acryloyiamino]ethyl-2'-(trimethylammonio)ethylphosphate, 3-[(meth)acryloylamino]propyl-2'-(trimethylammonio)ethylphosphate, 4-[(meth)acryloylarnino]butyl-2'-(trimethylammonio)ethylphosphate, (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, 2-hydroxyethyl (meth)acrylate, glycerol methacrylate (GMA), poly(ethylene glycol)ethyl (meth)acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth)acrylate having a weight average molecular weight of up to 1500, poly(ethylene glycol) monovinyl ether, poly(ethylene glycol) methyl vinyl ether, poly(ethylene glycol) monoallyl ether, poly(ethylene glycol) methyl allyl ether, vinyl alcohol, allyl alcohol, and combinations thereof, even more preferably selected from the group consisting of (meth)acryloyloxyethyl phosphorylcholine, (meth)acryloyloxypropyl phosphorylcholine, 2-[(meth)acryloylamino]ethyl-2'-(trimethylammonio)ethylphosphate, 3-[(meth)acryloylamino]propyl-2'-(trimethylammonio)ethylphosphate, (meth)acrylamide, dimethyl (meth)acrylamide, N-2-hydroxylethyl (meth)acrylamide, N,N-bis(hydroxyethyl) (meth)acrylamide, N-2,3-dihydroxypropyl (meth)acrylamide, N-tris(hydroxymethyl) methyl (meth)acrylamide, poly(ethylene glycol)ethyl (meth) acrylamide having a number average molecular weight of up to 1500, poly(ethylene glycol) (meth)acrylate having a number average molecular weight of up to 1500, N-vinylpyrrolidone, N-vinyl-N-methyl acetamide, methoxypoly(ethylene glycol)ethyl (meth)acrylamide having a number average molecular weight of up to 1500, methoxy polyethylene glycol (meth)acrylate having a weight average molecular weight of up to 1500, and combinations thereof.

PEGs with functional groups and multi-arm PEGs with functional groups can be obtained from various commercial suppliers, e.g., Creative PEGWorks, Polyscience, and Shearwater Polymers, etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionaly other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

Copolymers comprising a non-reactive hydrophilic vinylic monomer and a reactive vinylic monomer (e.g., a carboxyl-containing vinylic monomer, a primary amino group-containing vinylic monomer or a secondary amino group-containing vinylic monomer) can be prepared according to any well-known radical polymerization methods or obtained from commercial suppliers. Copolymers containing methacryloyloxyethyl phosphorylcholine and carboxyl-containing vinylic monomer (or amino-containing vinylic monomer) can be obtained from NOF Corporation (e.g., LIPIDURE®-A and -AF) or prepared according to the procedures described in U.S. Pat. No. 9,127,099.

The weight average molecular weight $M_w$ of the hydrophilic polymer having at least one amino, carboxyl or thiol group (as a hydrophilicity-enhancing agent) is preferably from about 500 to about 5,000,000, more preferably from about 1,000 to about 2,000,000, even more preferably from about 5,000 to about 1,000,000 Daltons.

Water-soluble and thermally-crosslinkable hydrophilic polymeric materials can be prepared according to the processes disclosed in U.S. Pat. Appl. Pub. Nos. US 2016/0061995 A1 and US2013/0337160 A1 and in U.S. Pat. No. 8,529,057.

In a preferred embodiment, the aqueous reactive solution comprises from 0.01% to about 10% by weight (preferably from 0.05% to about 5% by weight, more preferably from 0.08% to about 1% by weight, even more preferably from 0.1% to about 0.4% by weight) of an azetidinium-containing polymer and from about 0.01% to about 10% by weight (preferably from 0.02% to about 5% by weight, more preferably from 0.05% to about 2% by weight, even more preferably from 0.08% to about 1.0% by weight) of a hydrophilicity-enhancing agent having at least one reactive function group (carboxyl, primary amino, secondary amino group), the concentration ratio of the azetidinium-containing polymer to the hydrophilicity-enhancing agent is from about 1000:1 to 1:1000 (preferably from about 500:1 to about 1:500, more preferably from about 250:1 to about 1:250, even more preferably from about 100:1 to about 1:100).

In a preferred embodiment, the water-soluble thermally-crosslinkable polymeric material comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof (preferably carboxyl or thiol groups), wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains. The composition of a chemically-modified poly(2-oxazoline-co-ethyleneimine)-epichlorohydrin or a chemically-modified polyamidoamine-epichlorohydrin is determined by the composition (based on the total weight of the reactants) of a reactant mixture used for such a polymer according to the crosslinking reactions shown in Scheme I above. For example, if a reactant mixture comprises about 75% by weight of a polyamidoamine-epichlorohydrin and about 25% by weight of at least one hydrophilicity-enhancing agent based on the total weight of the reactants, then the resultant chemically-modified polyamidoamine-epichlorohydrin comprises about 75% by weight of first polymer chains derived from the polyamioamine-epichlorohydrin and about 25% by weight of hydrophilic moieties or second polymer chains derived from said at least one hydrophilicity-enhancing agent.

In accordance with the invention, the aqueous reactive coating solution has a pH of about 8.0 or less (preferably from about 6.0 to about 8.0, more preferably from about 6.5 to about 7.8, even more preferably from about 6.8 to about 7.6) and a temperature of about 30° C. or lower (preferably about 28° C. or lower, more preferably about 26° C. or lower, even more preferably about 24° C. or lower). The pH and temperature of the aqueous reactive coating solution is selected to minimize the hydrolysis of azetidinium groups into 2,3-dihydroxypropyl (HO—$CH_2$—CH(OH)—$CH_2$—) groups and the inter- and intra-crosslinking of the thermally-crosslinkable hydrophilic polymeric material and to maximize the shelf life time of the aqueous reactive coating solution.

A person skilled in the art knows well how to raise a pH of the aqueous reactive coating solution by adding a base in a solid form or an aqueous solution of a base at a high concentration. Any base can be used in the invention. Examples of preferred base includes without limitation NaOH, KOH, $NH_4OH$, $Na_2CO_3$, $K_2CO_3$, and combinations thereof.

In accordance with the invention, at a temperature of from about 40° C. to about 65° C. (preferably from about 40° C. to about 60° C., more preferably from about 45° C. to about 55° C.) and at a pH of at least about 9.5 (preferably from about 9.5 to about 11.0, more preferably from about 9.6 to about 10.7, even more preferably from about 9.8 to about 10.4), the thermally-crosslinkable hydrophilic polymeric material having azetidinium groups and optionally (but preferably) amino groups, thiol groups, carboxyl groups or combinations thereof can be crosslinked while covalently attaching the crosslinked thermally-crosslinkable hydrophilic polymeric material onto the base coating so as to form a hydrogel coating on the contact lens.

It is believed that at the selected pH and the selected temperature and after the given period of time (i.e., third period of time which is from about 5 minutes to about 240 minutes (preferably from about 5 minutes to about 200 minutes, more preferably from about 10 minutes to about 160 minutes, even more preferably from about 15 minutes to about 120 minutes), azetidnium groups which do not participate in crosslinking reaction may be hydrolyzed into 2,3-dihydroxypropyl (HO—$CH_2$—CH(OH)—$CH_2$—) groups and that the thermally-crosslinkable polymeric material left in the solution, if applicable, can be converted to a non-reactive hydrophilic polymeric material.

In accordance with the invention, after step (6), the resultant coated contact lenses having a hydrogel coating thereon can be subjected to additional processes, such as, rinsing with water or buffered saline, drying, packaging, etc.

In a preferred embodiment, the aqueous reactive coating solution comprises preferably from about 0.01% to about 2%, more preferably from about 0.05% to about 1.5%, even more preferably from about 0.1% to about 1%, most preferably from about 0.2% to about 0.5%, by weight of a water-soluble thermally-crosslinkable hydrophilic polymeric material having azetidinium groups.

In any one of the preferred embodiments described above of the various aspects of the invention, a contact lens produced according to a process of the invention has a friction rating of about 2 or lower (preferably about 1.5 or lower, more preferably about 1.0 or lower, even more preferably about 0.5 or lower) or a water-break-up time of at least about 10 seconds (preferably at least about 12.5 seconds, more preferably at least about 15 seconds, even more preferably at least about 17.5 seconds, most preferably at least about 20 seconds) after being subjected to 30 cycles of digital rubbing test or simulated abrasion cycling treatment.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A method for producing coated contact lenses each having a hydrogel coating thereon, comprising the steps of:
   (1) obtaining a preformed contact lens;
   (2) forming a base coating on the preformed contact lens according to a solution-coating procedure to form a treated contact lens having the base coating thereon, wherein the solution-coating process comprises contacting the preformed contact lens with a coating solution for a first period of time ($t_1$) at a first temperature ($T_1$) of from about 20° C. to about 65° C., wherein the coating solution has a first pH and the first temperature ($T_1$) and comprises from about 0.001% to about 5.0% by weight of a polyanionic polymer, wherein the polyanionic polymer is a homo- or copolymer of acrylic acid or $C_1$-$C_3$ alkylacrylic acid, wherein the first pH is from 0 to about 4.5;
   (3) rinsing the treated contact lens obtained in step (2) with water or an aqueous solution having a second pH of from about 6.0 to about 8.0 for a second period of time ($t_2$) at a second temperature ($T_2$) which is not higher than the first temperature ($T_1$); and
   (4) forming a coated contact lens have a hydrogel coating thereon by contacting the treated contact lens obtained in step (3) with an aqueous reactive coating solution at a third temperature ($T_3$) of from about 40° C. to about 65° C. for a third period of time, wherein the aqueous reactive coating solution has a third pH of at least about 9.5 and comprises a water-soluble, thermally-crosslinkable hydrophilic polymeric material having azetidinium groups; wherein the coated silicone hydrogel contact lens having the hydrogel coating thereon can pass Sudan Black staining test after simulated abrasion cycling treatment.

2. The method of embodiment 1, wherein the step of forming a coated contact lens have a hydrogel coating thereon is carried out by:
   (a) immersing the treated contact lens obtained in step (3) in an aqueous reactive coating solution which has a fourth temperature ($T_4$) of about 30° C. or lower and a fourth pH of about 8.0 or less, wherein the aqueous reactive coating solution comprises at least one ophthalmic salt at a concentration of at least 20 mM and the water-soluble, thermally-crosslinkable hydrophilic polymeric material having azetidinium groups;
   (b) raising the fourth pH to the third pH by adding a base into the aqueous reactive coating solution including the treated contact lens immersed therein; and
   (c) heating the aqueous reactive coating solution including the treated contact lens immersed therein and having the third pH to the third temperature ($T_3$) and then maintaining the third temperature ($T_3$) for third period of time ($t_3$) to form a coated contact lens have a hydrogel coating thereon.

3. The method of embodiment 1, wherein the step of forming a coated contact lens have a hydrogel coating thereon is carried out by:
   (a) immersing the treated contact lens obtained in step (3) in an aqueous reactive coating solution which has a fourth temperature of about 30° C. or lower and the third pH and which comprises the water-soluble, thermally-crosslinkable hydrophilic polymeric material having azetidinium groups and at least one ophthalmic salt at a concentration of at least 20 mM; and
   (b) heating the aqueous reactive coating solution including the treated contact lens immersed therein and having the third pH to the third temperature and then maintaining the third temperature for the third period of time to form a coated contact lens have a hydrogel coating thereon.

4. The method of embodiment 1, wherein the step of forming a coated contact lens have a hydrogel coating thereon is carried out by:
   (a) obtaining an aqueous reactive coating solution which has a fourth temperature of about 30° C. or lower (preferably about 28° C. or lower, more preferably about 26° C. or lower, even more preferably about 24° C. or lower) and a fourth pH of about 8.0 or less (preferably from about 6.0 to about 8.0, more preferably from about 6.5 to about 7.8, even more preferably from about 6.8 to about 7.6) and which comprises the water-soluble, thermally-crosslinkable hydrophilic polymeric material having azetidinium groups and at least one ophthalmic salt at a concentration of at least 20 mM;
   (b) raising the fourth pH to the third pH by adding a base into the aqueous reactive coating solution;
   (c) immersing the treated contact lens obtained in step (3) in the aqueous reactive coating solution having the third pH and the fourth temperature within about 1.5 hours or shorter after step (b); and
   (d) heating the aqueous reactive coating solution including the treated contact lens immersed therein and having the third pH to the third temperature and then maintaining the third temperature for the third period of time to form a coated contact lens have a hydrogel coating thereon.

5. The method of any one of embodiments 1 to 4, wherein the step of obtaining a preformed contact lens is carried out by:
   (i) cast-molding a polymerizable composition in a mold to form a molded contact lens; and
   (ii) extracting the molded contact lens with water, propylene glycol, polyethylene glycol having a number average molecular weight of 400 Daltons or less, an aqueous solution, or a mixture of water with propylene glycol or polyethylene glycol having a number average molecular weight of about 400 Daltons or less to remove unpolymerized polymerizable components.

6. The method of any one of embodiments 1 to 5, wherein the coating solution is obtained by dissolving the polyanionic polymer in water or a mixture of water with propylene glycol or polyethylene glycol having a number average molecular weight of about 400 Daltons or less and then adjusting pH to the first pH.

7. The method of any one of embodiments 1 to 6, wherein the first temperature $T_1$ is from about 25° C. to about 60° C.

8. The method of any one of embodiments 1 to 6, wherein the first temperature $T_1$ is from about 30° C. to about 55° C.

9. The method of any one of embodiments 1 to 8, wherein the first pH is from about 0.5 to about 4.0.

10. The method of any one of embodiments 1 to 8, wherein the first pH is from about 0.5 to about 3.5.

11. The method of any one of embodiments 1 to 8, wherein the first pH is from about 1.0 to about 3.0.

12. The method of any one of embodiments 1 to 11, wherein the coating solution comprises from about 0.005% to about 3.0% by weight of the polyanionic polymer.

13. The method of any one of embodiments 1 to 11, wherein the coating solution comprises from about 0.01% to about 2.5% by weight of the polyanionic polymer.

14. The method of any one of embodiments 1 to 11, wherein the coating solution comprises from about 0.02% to about 2.0%) by weight of the polyanionic polymer.

15. The method of any one of embodiments 1 to 14, wherein the polyanionic polymer is polyacrylic acid, polymethacrylic acid, poly(ethylacrylic acid), poly(propyacrylic acid), poly(acrylic acid-co-methacrylic acid), poly(acrylic acid-co-ethylacrylic acid), poly(acrylic acid-co-propylacrylic acid), poly[ethylacrylic acid-co-(meth)acrylic acid], poly[propylacrylic acid-co-(meth)acrylic acid], poly[ethylacrylic acid-co-propylacrylic acid], or mixtures thereof.

16. The method of any one of embodiments 1 to 14, wherein the polyanionic polymer is polyacrylic acid, polymethacrylic acid, poly(acrylic acid-co-methacrylic acid), or a mixture thereof.

17. The method of any one of embodiments 1 to 14, wherein the polyanionic polymer is polymethacrylic acid.

18. The method of any one of embodiments 1 to 17, wherein the coating solution comprises about 50% or less by weight of any organic solvent.

19. The method of any one of embodiments 1 to 17, wherein the coating solution comprises about 40% or less by weight of any organic solvent.

20. The method of any one of embodiments 1 to 17, wherein the coating solution comprises about 30% or less by weight of any organic solvent.

21. The method of any one of embodiments 1 to 17, wherein the coating solution comprises about 20% or less by weight of any organic solvent.
22. The method of any one of embodiments 1 to 17, wherein the coating solution comprises about 10% or less by weight of any organic solvent.
23. The method of any one of embodiments 1 to 17, wherein the coating solution comprises about 50% or less by weight of water.
24. The method of any one of embodiments 1 to 17, wherein the coating solution comprises about 40% or less by weight of water.
25. The method of any one of embodiments 1 to 17, wherein the coating solution comprises about 30% or less by weight of water.
26. The method of any one of embodiments 1 to 17, wherein the coating solutions comprises about 20% or less by weight of water.
27. The method of any one of embodiments 1 to 17, wherein the coating solution comprises about 10% or less by weight of water.
28. The method of any one of embodiments 1 to 27, wherein the polyanionic polymer has a weight average molecular weight of from about 100,000 to about 10,000,000 Daltons.
29. The method of any one of embodiments 1 to 27, wherein the polyanionic polymer has a weight average molecular weight of from about 200,000 to about 5,000,000 Daltons.
30. The method of any one of embodiments 1 to 27, wherein the polyanionic polymer has a weight average molecular weight of from about 300,000 Daltons to about 2,000,000 Daltons.
31. The method of any one of embodiments 1 to 30, wherein the first period of time $t_1$ is from about 5 minutes to about 240 minutes.
32. The method of any one of embodiments 1 to 30, wherein the first period of time $t_1$ is from about 5 minutes to about 200 minutes.
33. The method of any one of embodiments 1 to 30, wherein the first period of time ti is from about 5 minutes to about 160 minutes.
34. The method of any one of embodiments 1 to 30, wherein the first period of time ti is from about 10 minutes to about 120 minutes.
35. The method of any one of embodiments 1 to 30, wherein the first period of time ti is from about 10 minutes to about 60 minutes.
36. The method of any one of embodiments 1 to 35, wherein the treated contact lens obtained in step (2) is rinsed with water.
37. The method of any one of embodiments 1 to 35, wherein the treated contact lens obtained in step (2) is rinsed with an aqueous solution having a pH from about 6.0 to about 8.0.
38. The method of embodiment 37, wherein the aqueous solution comprises at least one ophthalmically compatible salt selected from the group consisting of NaCl, KCl, sodium and potassium salts of phosphoric acid, carbonic acid, boric acid, acetic acid, and citric acid, and combinations thereof.
39. The method of any one of embodiments 1 to 38, wherein the second temperature $T_2$ is at least about 5° C. lower than the first temperature $T_1$ (i.e., $T_1-T_2 \geq 5°$ C.).
40. The method of any one of embodiments 1 to 38, wherein the second temperature $T_2$ is at least about 10° C. lower than the first temperature $T_1$ (i.e., $T_1-T_2 \geq 10°$ C.).
41. The method of any one of embodiments 1 to 38, wherein the second temperature $T_2$ is at least about 15° C. lower than the first temperature $T_1$ (i.e., $T_1-T_2 \geq 15°$ C.).
42. The method of any one of embodiments 1 to 41, wherein the second period of time $t_2$ is from about 5 minutes to about 240 minutes.
43. The method of any one of embodiments 1 to 41, wherein the second period of time $t_2$ is from about 5 minutes to about 180 minutes.
44. The method of any one of embodiments 1 to 41, wherein the second period of time $t_2$ is from about 10 minutes to about 120 minutes.
45. The method of any one of embodiments 1 to 41, wherein the second period of time $t_2$ is from about 10 minutes to about 60 minutes.
46. The method of any one of embodiments 1 to 45, wherein the third temperature $T_4$ is about 28° C. or lower.
47. The method of any one of embodiments 1 to 45, wherein the third temperature $T_4$ is about 26° C. or lower.
48. The method of any one of embodiments 1 to 45, wherein the third temperature $T_4$ is about 24° C. or lower.
49. The method of any one of embodiments 1 to 48, wherein the fourth pH is from about 6.0 to about 8.0.
50. The method of any one of embodiments 1 to 48, wherein the fourth pH is from about 6.5 to about 7.8.
51. The method of any one of embodiments 1 to 48, wherein the fourth pH is from about 6.8 to about 7.6.
52. The method of any one of embodiments 1 to 51, wherein the aqueous reactive coating solution comprises at least 25 mM of said at least one ophthalmically compatible salt.
53. The method of any one of embodiments 1 to 51, wherein the aqueous reactive coating solution comprises at least 30 mM of said at least one ophthalmically compatible salt.
54. The method of any one of embodiments 1 to 51, wherein the aqueous reactive coating solution comprises at least 35 mM of said at least one ophthalmically compatible salt.
55. The method of any one of embodiments 52 to 54, wherein said at least one ophthalmically compatible salt is selected from the group consisting of NaCl, KCl, sodium and potassium salts of phosphoric acid, carbonic acid, boric acid, acetic acid, and citric acid, and combinations thereof.
56. The method of any one of embodiments 52 to 54, wherein said at least one ophthalmically compatible salt comprises $NaHCO_3$ and/or $KHCO_3$.
57. The method of any one of embodiments 1 to 56, wherein the third pH is from about 9.5 to about 11.0.
58. The method of any one of embodiments 1 to 56, wherein the third pH is from about 9.6 to about 10.7.
59. The method of any one of embodiments 1 to 56, wherein the third pH is from about 9.8 to about 10.4.
60. The method of any one of embodiments 1 to 59, wherein the base is selected from the group consisting of NaOH, KOH, $NH_4OH$, $K_2CO_3$, $Na_2CO_3$, and combinations thereof.
61. The method of any one of embodiments 1 to 60, wherein the third temperature is from about 40° C. to about 60° C.
62. The method of any one of embodiments 1 to 60, wherein the third temperature is from about 45° C. to about 55° C.
63. The method of any one of embodiments 1 to 62, wherein the coated contact lens having the hydrogel coating thereon passes Sudan Black staining test after being subjected to 30 cycles of digital rubbing treatment.
64. The method of any one of embodiments 1 to 62, wherein the coated contact lens having the hydrogel coating thereon passes Sudan Black staining test after being subjected to simulated abrasion cycling treatment.
65. The method of any one of embodiments 1 to 64, wherein the third period of time $t_3$ is from about 5 minutes to about 240 minutes.

66. The method of any one of embodiments 1 to 64, wherein the third period of time $t_3$ is from about 5 minutes to about 200 minutes.

67. The method of any one of embodiments 1 to 64, wherein the third period of time $t_3$ is from about 10 minutes to about 160 minutes.

68. The method of any one of embodiments 1 to 64, wherein the third period of time $t_3$ is from about 15 minutes to about 120 minutes.

69. The method of any one of embodiments 1 to 68, wherein the thermally-crosslinkable hydrophilic polymeric material is a partially-crosslinked polymeric material that comprises a three-dimensional network and the azetidinium groups within the network or being attached to the network.

70. The method of embodiment 69, wherein the thermally-crosslinkable hydrophilic polymeric material is a partial reaction product of at least one azetidinium-containing polymer with at least one hydrophilicity-enhancing agent having at least one carboxyl, primary amine, secondary amine, or thiol group.

71. The method of embodiment 69 or 70, wherein the thermally-crosslinkable hydrophilic polymeric material comprises:
(i) from about 20% to about 95% by weight of first polymer chains derived from at least one azetidinium-containing polymer,
(ii) from about 5% to about 80% by weight of hydrophilic moieties each from at least one hydrophilicity-enhancing agent having at least one reactive functional group selected from the group consisting of amino group, carboxyl group, thiol group, and combination thereof (preferably carboxyl groups), wherein the hydrophilic moieties are covalently attached to the first polymer chains through one or more covalent linkages each formed between one azetitdinium group of the azetidinium-containing polymer and one amino, carboxyl or thiol group of the hydrophilicity-enhancing agent, and
(iii) azetidinium groups which are parts of the first polymer chains or pendant or terminal groups covalently attached to the first polymer chains.

72. The method of embodiment 69 or 70, wherein the thermally-crosslinkable hydrophilic polymeric material comprises:
(i) from about 20% to about 95% by weight of first polymer chains derived from at least one azetidinium-containing polymer,
(ii) from about 5% to about 80% by weight of second polymer chains derived from at least one hydrophilicity-enhancing agent having at least one reactive functional group selected from the group consisting of amino group, carboxyl group, thiol group, and combination thereof (preferably carboxyl groups), wherein the second polymer chains are covalently attached to the first polymer chains through one or more covalent linkages each formed between one azetitdinium group of the azetidinium-containing polymer and one amino, carboxyl or thiol group of the hydrophilicity-enhancing agent, and
(iii) azetidinium groups which are parts of the first polymer chains or pendant or terminal groups covalently attached to the first polymer chains.

73. The method of embodiment 71 or 72, wherein said at least one azetidinium-containing polymer is a polyamidoamine-epichlorohydrin.

74. The method of embodiment 71 or 72, wherein said at least one azetidinium-containing polymer is poly(2-oxazoline-co-ethyleneimine)-epichlorohydrin.

75. The method of any one of embodiments 70, 71, 73 and 74, wherein the hydrophilicity-enhancing agent is a primary amine-containing monosaccharide, a secondary amine-containing monosaccharide, a carboxyl-containing monosaccharide, a thiol-containing monosaccharide, a primary amine-containing disaccharide, a secondary amine-containing disaccharide, a carboxyl-containing disaccharide, a thiol-containing disaccharide, a primary amine-containing oligosaccharide, a secondary amine-containing oligosaccharide, a carboxyl-containing oligosaccharide, a thiol-containing oligosaccharide, or a combination thereof.

76. The method of any one of embodiments 70 and 72 to 74, wherein the hydrophilicity-enhancing agent is: a polyethylene glycol having one sole amino, carboxyl or thiol group; a polyethylene glycol with two terminal amino, carboxyl and/or thiol groups; a multi-arm polyethylene glycol with one or more amino, carboxyl and/or thiol groups; a polyethylene glycol dendrimer with one or more amino, carboxyl and/or thiol groups.

77. The method of any one of embodiments 70 and 72 to 74, wherein the hydrophilicity-enhancing agent is a copolymer which is a polymerization product of a composition comprising (1) about 60% or less by weight of one or more reactive vinylic monomers and (2) one or more non-reactive hydrophilic vinylic monomers.

78. The method of embodiment 77, wherein said one or more reactive vinylic monomers are vinylic monomers having a carboxyl group (preferably are selected from the group consisting of acrylic acid, methacrylic acid, ethyl acrylic acid, N,N-2-acrylamidoglycolic acid, and combinations thereof).

79. The method of embodiment 77, wherein said one or more reactive vinylic monomers are vinylic monomers having an amino group (preferably are amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, and combinations thereof).

80. The method of any one of embodiments 77 to 79, wherein said one or more non-reactive vinylic monomers are selected from the group consisting of (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, 3-(meth)acryloylamino-1-propanol, N-hydroxyethyl (meth)acrylamide, N-hydroxypropyl (meth)acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof (preferably from the group consisting of acryamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof).

81. The method of any one of embodiments 77 to 79, wherein said one or more non-reactive vinylic monomers are phosphorylcholine-containing vinylic monomers (preferably methacryloyloxyethyl phosphorylcholine).

82. The method of any one of embodiments 77 to 81, wherein the composition comprises about 50% or less by weight (preferably from about 0.1% to about 30% by weight, more preferably from about 0.5% to about 20% by weight, even more preferably from about 1% to about 15% by weight) of said one or more reactive vinylic monomers.

83. The method of any one of embodiments 70 and 72 to 74, wherein the hydrophilicity-enhancing agent is a primary amine-containing polysaccharide, a secondary amine-containing polysaccharide, a carboxyl-containing polysaccharide, hyaluronic acid, chondroitin sulfate, or a combination thereof.

84. The method of any one of embodiments 1 to 83, wherein the coated contact lens has a water-break-up time of at least 10 seconds after being subjected to 30 cycles of digital rubbing treatment.

85. The method of any one of embodiments 1 to 83, wherein the coated contact lens has a water-break-up time of at least 12.5 seconds after being subjected to 30 cycles of digital rubbing treatment.

86. The method of any one of embodiments 1 to 83, wherein the coated contact lens has a water-break-up time of at least 15 seconds after being subjected to 30 cycles of digital rubbing treatment.

87. The method of any one of embodiments 1 to 83, wherein the coated contact lens has a water-break-up time of at least 17.5 seconds after being subjected to 30 cycles of digital rubbing treatment.

88. The method of any one of embodiments 1 to 83, wherein the coated contact lens has a water-break-up time of at least 20 seconds after being subjected to 30 cycles of digital rubbing treatment.

89. The method of any one of embodiments 1 to 88, wherein the coated contact lens has a water-break-up time of at least 10 seconds after being subjected to simulated abrasion cycling treatment.

90. The method of any one of embodiments 1 to 88, wherein the coated contact lens has a water-break-up time of at least 12.5 seconds after being subjected to simulated abrasion cycling treatment.

91. The method of any one of embodiments 1 to 88, wherein the coated contact lens has a water-break-up time of at least 15 seconds after being subjected to simulated abrasion cycling treatment.

92. The method of any one of embodiments 1 to 88, wherein the coated contact lens has a water-break-up time of at least 17.5 seconds after being subjected to simulated abrasion cycling treatment.

93. The method of any one of embodiments 1 to 88, wherein the coated contact lens has a water-break-up time of at least 20 seconds after being subjected to simulated abrasion cycling treatment.

94. The method of any one of embodiments 1 to 93, wherein the coated contact lens has a friction rating of about 2.0 or lower after being subjected to 30 cycles of digital rubbing treatment.

95. The method of any one of embodiments 1 to 93, wherein the coated contact lens has a friction rating of about 1.5 or lower after being subjected to 30 cycles of digital rubbing treatment.

96. The method of any one of embodiments 1 to 93, wherein the coated contact lens has a friction rating of about 1.0 or lower after being subjected to 30 cycles of digital rubbing treatment.

97. The method of any one of embodiments 1 to 93, wherein the coated contact lens has a friction rating of about 0.5 or lower after being subjected to 30 cycles of digital rubbing treatment.

98. The method of any one of embodiments 1 to 97, wherein the coated contact lens has a friction rating of about 2.0 or lower after being subjected to simulated abrasion cycling treatment.

99. The method of any one of embodiments 1 to 97, wherein the coated contact lens has a friction rating of about 1.5 or lower after being subjected to simulated abrasion cycling treatment.

100. The method of any one of embodiments 1 to 97, wherein the coated contact lens has a friction rating of about 1.0 or lower after being subjected to simulated abrasion cycling treatment.

101. The method of any one of embodiments 1 to 97, wherein the coated contact lens has a friction rating of about 0.5 or lower after being subjected to simulated abrasion cycling treatment.

102. The method of any one of embodiments 1 to 101, wherein the preformed contact lens is a hard contact lens essentially made of a hard plastic material.

103. The method of embodiment 102, wherein the hard plastic material is a crosslinked polymethacrylate.

104. The method of any one of embodiments 1 to 101, wherein the preformed contact lens is a rigid gas permeable contact lens essentially made of a rigid gas permeable lens material.

105. The method of any one of embodiments 1 to 101, wherein the preformed contact lens is a soft silicone contact lens essentially made of a crosslinked silicone material.

106. The method of any one of embodiments 1 to 101, wherein the preformed contact lens is a hybrid contact lens having a central optical zone which is essentially made of a rigid gas permeable lens material and is surrounded by a peripheral zone essential made of a non-silicone hydrogel material.

107. The method of any one of embodiments 1 to 101, wherein the preformed contact lens is a hybrid contact lens having a central optical zone which is essentially made of a rigid gas permeable lens material and is surrounded by a peripheral zone essential made of a silicone hydrogel material.

108. The method of any one of embodiments 1 to 101, wherein the preformed contact lens is a hybrid contact lens having a central optical zone which is essentially made of a crosslinked silicone material and is surrounded by a peripheral zone essential made of a non-silicone hydrogel material.

109. The method of any one of embodiments 1 to 101, wherein the preformed contact lens is a hybrid contact lens having a central optical zone which is essentially made of a crosslinked silicone material and is surrounded by a peripheral zone essential made of a silicone hydrogel material.

110. The method of any one of embodiments 1 to 101, wherein the preformed contact lens comprises at least one article embedded in the bulk material of the preformed contact lens.

111. The method of embodiment 110, wherein the article is an electronic device.

112. The method of embodiment 110, wherein the article is an electro-optic device.

113. The method of embodiment 110, wherein the article is a piece of a rigid gas permeable lens material.

114. The method of embodiment 110, wherein the article is a piece of a crosslinked silicone material.

115. The method of any one of embodiments 110 to 114, wherein the bulk material is a non-silicone hydrogel material.
116. The method of any one of embodiments 110 to 114, wherein the bulk material is a silicone hydrogel material.
117. The method of any one of embodiments 1 to 101, wherein the preformed contact lens is a non-silicon hydrogel contact lens essentially made of a non-silicone hydrogel material.
118. The method of embodiment 106, 108, 115, or 117, wherein the non-silicon hydrogel material comprises at least 50% by mole of repeating units of at least one hydroxyl-containing vinylic monomer.
119. The method of embodiment 118, wherein said at least one hydroxyl-containing vinylic monomer is selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof.
120. The method of embodiment 118, wherein said at least one hydroxyl-containing vinylic monomer is selected from the group consisting of hydroxyethyl (meth)acrylate, glycerol (meth)acrylate, and vinyl alcohol.
121. The method of any one of embodiments 1 to 101, wherein the inner layer and the lens bulk material independent of each other are a preformed contact lens essentially made of a silicone hydrogel material.
122. The method of any one of embodiments 107, 109, 116, and 121, wherein the silicon hydrogel material comprises repeating units of at least one polysiloxane vinylic monomer.
123. The method of any one of embodiments 107, 109, 116, 121, and 122, wherein the silicone hydrogel material comprises repeating units of at least one polysiloxane vinylic crosslinker.
124. The method of any one of embodiments 107, 109, 116, and 121 to 123, wherein the silicone hydrogel material comprises repeating units of at least one hydrophilic vinylic monomer.
125. The method of any one of embodiments 107, 109, 116, and 121 to 124, wherein the silicone hydrogel material comprises repeating units of at least one hydrophilic N-vinyl amide monomer.
126. The method of any one of embodiments 107, 109, 116, and 121 to 125, wherein the silicone hydrogel material comprises repeating units of at least one polycarbosiloxane vinylic monomer.
127. The method of any one of embodiments 107, 109, 116, and 121 to 126, wherein the silicone hydrogel material comprises repeating units of at least one polycarbosiloxane vinylic crosslinker.
128. The method of any one of embodiments 107, 109, 116, and 121 to 127, wherein the silicone hydrogel material comprises repeating units of at least one silicone-containing vinylic monomer having a bis(trialkylsilyloxy)alkylsilyl or tris(trialkylsilyloxy)silyl group.
129. The method of any one of embodiments 107, 109, 116, and 121 to 128, wherein the silicone hydrogel material comprises repeating units of one or more blending vinylic monomers.
130. The method of any one of embodiments 107, 109, 116, and 121 to 129, wherein the silicone hydrogel material comprises repeating units of one or more blending vinylic monomers in an amount of about 25% or less by weight, relative to the dry weight of the inner layer of the silicone hydrogel material.
131. The method of any one of embodiments 107, 109, 116, and 121 to 129, wherein the silicone hydrogel material comprises repeating units of one or more blending vinylic monomers in an amount of about 20% or less by weight, relative to the dry weight of the inner layer of the silicone hydrogel material.
132. The method of any one of embodiments 107, 109, 116, and 121 to 129, wherein the silicone hydrogel material comprises repeating units of one or more blending vinylic monomers in an amount of about 15% or less by weight, relative to the dry weight of the inner layer of the silicone hydrogel material.
133. The method of any one of embodiments 107, 109, 116, and 121 to 132, wherein the silicone hydrogel material comprises repeating units of one or more non-silicone vinylic crosslinking agents.
134. The method of any one of embodiments 107, 109, 116, and 121 to 132, wherein the silicone hydrogel material comprises repeating units of one or more non-silicone vinylic crosslinking agents in an amount of about 1.0% or less, relative to the dry weight of the inner layer.
135. The method of any one of embodiments 107, 109, 116, and 121 to 132, wherein the silicone hydrogel material comprises repeating units of one or more non-silicone vinylic crosslinking agents in an amount of about 0.8% or less, relative to the dry weight of the inner layer.
136. The method of any one of embodiments 107, 109, 116, and 121 to 132, wherein the silicone hydrogel material comprises repeating units of one or more non-silicone vinylic crosslinking agents in an amount of from about 0.05% to about 0.6% by weight, relative to the dry weight of the inner layer.
137. A coated contact lens produced according to the method of any one of embodiments 1 to 136.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

EXAMPLE 1

Chemicals

The following abbreviations are used in the following examples: TrisMA represents tris(trimethylsilyloxy)silylpropyl (meth)acrylate; DMA represents N,N-dimethylacrylamide; DC 1173 is DAROCUR® 1173 (2-hydroxy-2-methyl-1-phenyl-1-propanone); PG represents propylene glycol; PrOH represents 1-propanol; IPA represents isopropanol; PAA represents polyacrylic acid; PAE represents polyamidoamine-epichlorohydrin (a.k.a., polyamine-epichlorohydrin); Poly(AAm-co-AA) represents poly(acrylamide-co-acrylic acid); PBS represents a phosphate-buffered saline which has a pH of 7.2±0.2 at 25° C. and contains about 0.044 wt. % $NaH_2PO_4.H_2O$, about 0.388 wt. % $Na_2HPO_4.2H_2O$, and about 0.79 wt. % NaCl and; wt. % represents weight percent; CE-PDMS represents a chain-extended polydimethylsiloxane crosslinker which has three polydimethylsiloxane (PDMS) segments linked via diurethane linkages between two PDMS segments and two urethane linkages each located between one terminal methacrylate group and one PDMS segment and which is prepared according to the procedures described in Example 2 of U.S. Pat. No. 8,529,057.

Oxygen Permeability Measurements

The apparent oxygen permeability ($Dk_{app}$), the apparent oxygen transmissibility (Dk/t), the intrinsic (or edge-corrected) oxygen permeability ($Dk_c$) of a lens and a lens material are determined according to procedures described in Example 1 of U.S. patent application publication No. 2012/0026457 A1 (herein incorporated by reference in its entirety).

Digital Rubbing Treatment

The lenses are digitally rubbed (wearing disposable powder-free latex gloves) with RENU® multi-purpose lens care solution (or another multi-purpose lens care solution) for 20 seconds and then rinsed with saline. The above procedure is repeated for i time (i.e., i cycles of digital rubbing) that imitates daily cleaning in a i-days lens care regime, e.g. 7 times (i.e., 7 cycles of digital rubbing) that imitates daily cleaning and disinfecting in a 7-days lens care regime), or 30 times (i.e., 30 cycles of digital rubbing) that imitates daily cleaning and disinfecting in a 30-days lens care regime.

Simulated Abrasion Cycling Treatment (SACT)

To simulate a worst-case scenario for manual cycling, a simulated abrasion technique is used to ensure consistent pressure and shearing conditions. To do this, a customized lens holder is made to grip the lens while shearing the lens. As shown in FIG. 1, the lens (part 1) is placed on a rubber insert (part 2) with a 7.7 mm diameter central shaft (part 3) fitted axially. The top clip (part 4) is clipped onto the bottom clip (part 5), which holds the lens tightly against the silicone gasket. The central shaft is then extended so the lens is sticking above the outer body surface, exposing the lens circular area around the center of the lens. Optionally, a piece of cloth (i.e. Twillx 1622, Berkshire) can be placed between the central shaft and contact lens to enhance abrasion visualization.

The entire lens holder is placed on the attachment end of the Taber linear abrader system (Taber Industries, model 5750, http://www.taberindustries.com/linear-abraser). Wth no added weights are attached, the entire weight of the bearing arm and lens holder (230 g normal force) is applied to the 47 mm² contact lens area, allowing 49 kPa to be applied to the counter surface. For the counter surface, a sheet of silicone rubber (10 A, ¼" thick) is placed underneath the bearing arm, and a reservoir channel is clipped to the silicone rubber. The reservoir is then filled with PBS at room temperature.

During the experiment, the lens holder is slowly dropped to the counter surface, and the lens is abraded 20 times (3" per stroke, 6" total travel per cycle) at a frequency of 75 cycles per minute. The lens surface can be analyzed using the water break up time methodology, lubricity evaluation, and/or Sudan Black staining test.

While this technique applies a shear force well beyond what a typical contact lens would experience, this controlled shearing technique (i.e., simulated abrasion cycling treatment) is found to be a reasonable equivalent of 30 cycles of digital rubbing treatment and provides assurance that these contact lenses will be able to handle even the harshest mechanical cycling.

Lubricity Evaluation

The lubricity of a contact lens is evaluated by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS (phophspate buffer saline having the following composition: 0.044 w/w % $NaH_2PO_4 \cdot H_2O$, ca. 0.388 w/w/% $Na_2HPO_4 \cdot 2H_2O$, and ca. 0.79 w/w % NaCl) for at least two rinses of 30 minutes each and then transferred to fresh PBS before the evaluation.

Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

The finger lubricities (i.e., friction ratings) of a contact lens can be determined either directly out-of-pack (OOP) but after 30 min soaking in PBS) or after i cycles (e.g., 7, 14, 21, or 30 cycles) of digital rubbing treatment, or after simulated abrasion cycling treatment according to the procedures described above.

Water Break-Up Time (WBUT) Tests

The surface hydrophilicity of lenses (after autoclave) is assessed by determining the time required for the water film to start breaking on the lens surface. Lenses exhibiting WBUT 10 seconds are considered to have a hydrophilic surface and are expected to exhibit adequate wettability (ability to support the tear film) on-eye.

Lenses are prepared for water breakup measurement by removing the lens from its blister with soft plastic tweezers (e.g., those from Menicon) and placing the lens in a test tube containing phosphate buffered saline. The test tube contains 10 mL phosphate buffered saline per lens, 1 lens per test tube. Lenses are soaked overnight (at least 16 hours) before testing.

WBUT is measured at room temperature as follows: the lens is removed from the test tube and placed on a pedestal submerged in PBS. The pedestal is then raised out of the PBS solution (t=0), and a video camera monitors the fluid flowing off the lens surface. When the lens surface fluid breaks, this WBUT time is recorded. Optionally, a stop watch can be used to measure the time between when the pedestal is raised out of the PBS and when the lens surface fluid breaks. The pedestal is withdrawn, pulling the lens beneath the surface of the PBS. At least 3 spots per lenses are measured, and at least 3 lenses are measured to obtain an average WBUT measurement for each lens group.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Coating Intactness Tests

The intactness of a coating on the surface of a contact lens can be tested according to Sudan Black stain test as follow. Contact lenses with a coating (an LbL coating, a plasma coating, a hydrogel coating, or any other coatings) are dipped into a Sudan Black dye solution (Sudan Black in the mixture ~80% mineral oil and ~20% vitamin E oil). Sudan Black dye is hydrophobic and has a great tendency to be adsorbed by a hydrophobic material or onto a hydrophobic lens surface or hydrophobic spots on a partially coated surface of a hydrophobic lens (e.g., silicone hydrogel contact lens). If the coating on a hydrophobic lens is intact, no staining spots should be observed on or in the lens. All of the lenses under test are fully hydrated. Visible fine lines on lens surface may indicate the presence of cracking of the cross-linked coatings.

EXAMPLE 2

Preparation of PAA Aqueous Solution

An aqueous solution of polyacrylic acid (PAA) is prepared by adding adequate amount of PAA (Mn~450 KD) in water (distilled or deionized water) to have a concentration of about 0.1 wt. %. After PAA is fully dissolved, the pH is adjusted by adding formic acid (1.87 wt %) to the PAA solution to lower the final pH to 2. The prepared PAA solution is filtered to remove any particulate or foreign matter.

IPC-1 Saline

IPC-1 saline is prepared by dissolving/mixing appropriate amounts of Poly(AAm-co-AA)(90/10), PAE, $NaH_2PO_4.H_2O$, $Na_2HPO_4.2H_2O$ and NaCl in DI (de-ionized) water to have the following concentrations: about 0.132 wt. % of poly(AAm-co-AA); about 0.11 wt. % PAE; about 0.044 wt. % $NaH_2PO4.H_2O$, about 0.388 wt. % $Na_2HPO_4.2H_2O$, and about 0.79 wt. % NaCl and then by adjusting pH to about 7.3. Poly(AAm-co-AA)(90/10) partial sodium salt, poly(AAm-co-AA) 90/10, Mw 200,000) is purchased from Polysciences, Inc. and used as received. The prepared solution is pre-treated at 65° C. for about 6 hours. After the heat pre-treatment, the IPC saline is cooled down back to room temperature. Up to 5 ppm hydrogen peroxide maybe added to the final IPC saline to prevent bioburden growth and the IPC saline is filtered using a 0.22 micron membrane filter.

Phosphate Buffered Saline (PBS)

A phosphate buffered saline is prepared by dissolving $NaH_2PO_4.H_2O$, $Na_2HPO_4.2H_2O$, and in a given volume of purified water (distilled or deionized) to have the following composition: ca. 0.044 w/w % $NaH_2PO_4.H_2O$, ca. 0.388 w/w/ % $Na_2HPO_4.2H_2O$, and ca. 0.79 w/w % NaCl.

Phosphate Buffered (PB) Without NaCl (PB, No NaCl)

PB is prepared using the same procedure for preparing PBS, but no NaCl is added.

IPC-1m Saline (Modified IPC-1 Saline)

Approximately 1 hr before the IPC dip step, the standard IPC-1 solution is pH adjusted to 10 using 5N NaOH and also has 0.1 wt % of sodium bicarbonate added to the solution and mixed. This modified IPC-1 saline (IPC-1m) is used in the IPC dip step in the following examples.

Contact Lens Formulation Composition (FT05-BE)

Lens formulation (i.e., polymerizable composition) is prepared by dissolving the required components in ethylene glycol butyl ether to having the following composition: CE-PDMS (32.3% by weight); TrisMA (21.0% by weight); DC 1173 (1.0% by weight); DMA (23.6% by weight); and ethylene glycol butyl ether (22.1% by weight).

Cast-Molded Silicone Hydrogel (SiHy) Contact Lenses

Cast-molded contact lenses are prepared by dosing the FT05-BE formulation in Zeonar contact lens molds and then curing using a double-sided UV curing oven having ~3-5 mW/cm2 intensity (Philips lights, 40 watt, F405) for 10 minutes.

EXAMPLE 3

PAA-Coated SiHy Contact Lenses

Cast-molded SiHy contact lenses prepared in Example 2 are used in this example. After de-molding, cast-molded SiHy contact lenses are extracted with a water-propylene glycol (PG) mixture (50 wt %/50 wt %) for about 60 minutes for lens extraction at 30° C., rinsed twice in de-ionized (DI) water at 30° C. for 30 min, dip-coated in the PAA solution prepared in Example 2 for about 60 min at 45° C., rinsed with PBS prepared in Example 2 for about 30 minutes at room temperature, and finally rinsed in DI water for 2 minutes to remove the salts.

The PAA-coated SiHy contact lenses prepared above are stored dry in a petri dish. The coating uniformity or intactness of the dry-stored PAA-coated SiHy contact lenses is tested by overnight soaking in 5 ppm OptiFree Replenish solution and then subjecting to Sudan black dye testing (Coating Intactness Test as described in Example 1). PAA-coated SiHy contact lenses show slight levels of Sudan Black staining. The resultant PAA-coated SiHy contact lenses is lubricious (having a friction rating of 0), water break-up time >30 sec and sessile-drop contact angle around 90 degrees. The lenses were also assessed for impact of mechanical wear by subjecting them to Simulated Abrasion Cycling Treatment (SACT) as described in Example 1 and then evaluating the lenses using Sudan Black testing. The lenses show Sudan Black staining after being subjected to SACT.

EXAMPLE 4

Water Gradient SiHy Contact Lenses Prepared at High Temperature

Cast-molded SiHy contact lenses prepared in Example 2 are used in this example. After de-molding, cast-molded SiHy contact lenses are extracted with a water-propylene glycol (PG) mixture (50 wt %/50 wt %) for about 60 minutes at 30° C. for lens extraction, rinsed twice in DI water at 30° C. for 30 min, dip-coated in the PAA solution prepared in Example 2 for about 60 min at 45° C., and finally rinsed with PBS prepared in Example 2 for about 30 minutes at room temperature. They are then packaged/sealed in polypropylene lens packaging shells (blisters) with 0.65 mL of the IPC-1 saline prepared in Example 2. The sealed lens packages are autoclaved for about 45 minutes at about 121° C., forming SiHy contact lenses with a cross-linked hydrophilic coating (i.e., a hydrogel coating) thereon (i.e., water gradient SiHy contact lenses).

After removing from the sealed/autoclaved lens packaging shells, the water gradient SiHy contact lenses are rinsed in DI water for 2 minutes to remove the salts and then stored dry in a petri dish. The coating uniformity or intactness of the dry-stored water gradient SiHy contact lenses is tested by overnight soaking in 5 ppm OptiFree Replenish solution and then subjecting to Sudan black dye testing (Coating Intactness Tests). The lenses show no Sudan Black staining. The resultant water-gradient SiHy contact lens is lubricious (having a friction rating of 0.5), water break-up time >30 sec and sessile-drop contact angle around 40 degrees. The lenses were also assessed for impact of mechanical wear by subjecting them to SACT as described in Example 1 and then evaluating the lenses using Sudan Black testing. The lenses show no Sudan Black staining after being subjected to SACT.

EXAMPLE 5

Water Gradient SiHy Contact Lenses Prepared at Low Temperature

Cast-molded SiHy contact lenses prepared in Example 2 are used in this example. After de-molding, cast-molded SiHy contact lenses are extracted with a water-propylene glycol (PG) mixture (50 wt %/50 wt %) for about 60 minutes at 30° C. for lens extraction, rinsed twice in DI water at 30° C. for 30 min, dip-coated in the PAA solution prepared in Example 2 for about 60 min at 45° C., rinsed with DI water for about 10 minutes at room temperature, dip coated in the IPC-1m saline prepared in Example 2 at 50° C. for about 60 min, rinsed again in PB prepared in Example 2 for 30 minutes at room temperature and finally rinsed in DI water for 2 minutes to remove the salts.

The water gradient SiHy contact lenses prepared above are stored dry in a petri dish. The coating uniformity or intactness of the dry-stored water gradient SiHy contact lenses is tested by overnight soaking in 5 ppm OptiFree Replenish solution and then subjecting to Sudan black dye testing (Coating Intactness Tests). The lenses show no Sudan Black staining. The resultant water-gradient SiHy contact lens is lubricious (having a friction rating of 1), water break-up time >30 sec and sessile-drop contact angle around 40 degrees. The lenses were also assessed for impact of mechanical wear by subjecting them to SACT as described in Example 1 and then evaluating the lenses using Sudan Black testing. The lenses show no Sudan Black staining after being subjected to SACT.

All the publications, patents, and patent application publications, which have been cited herein above in this application, are hereby incorporated by reference in their entireties.

What is claimed is:

1. A method for producing coated contact lenses each having a hydrogel coating thereon, comprising the steps of:
    (1) obtaining a preformed contact lens;
    (2) forming a base coating on the preformed contact lens according to a solution-coating procedure to form a treated contact lens having the base coating thereon, wherein the solution-coating process comprises contacting the preformed contact lens with a coating solution for a first period of time ($t_1$) at a first temperature ($T_1$) of from about 20° C. to about 65° C., wherein the coating solution has a first pH and the first temperature ($T_1$) and comprises from about 0.001% to about 5.0% by weight of a polyanionic polymer, wherein the polyanionic polymer is a homo- or copolymer of acrylic acid or $C_1$-$C_3$ alkylacrylic acid, wherein the first pH is from 0 to about 4.5;
    (3) rinsing the treated contact lens obtained in step (2) with water or an aqueous solution having a second pH of from about 6.0 to about 8.0 for a second period of time ($t_2$) at a second temperature ($T_2$) which is not higher than the first temperature ($T_1$); and
    (4) forming a coated contact lens have a hydrogel coating thereon by contacting the treated contact lens obtained in step (3) with an aqueous reactive coating solution at a third temperature ($T_3$) of from about 40° C. to about 65° C. for a third period of time, wherein the aqueous reactive coating solution has a third pH of at least about 9.5 and comprises a water-soluble, thermally-crosslinkable hydrophilic polymeric material having azetidinium groups; wherein the coated silicone hydrogel contact lens having the hydrogel coating thereon can pass Sudan Black staining test after simulated abrasion cycling treatment.

2. The method of claim 1, wherein the step of forming a coated contact lens have a hydrogel coating thereon is carried out by:
    (a) immersing the treated contact lens obtained in step (3) in an aqueous reactive coating solution which has a fourth temperature ($T_4$) of about 30° C. or lower and a fourth pH of about 8.0 or less, wherein the aqueous reactive coating solution comprises at least one ophthalmic salt at a concentration of at least 20 mM and the water-soluble, thermally-crosslinkable hydrophilic polymeric material having azetidinium groups;

(b) raising the fourth pH to the third pH by adding a base into the aqueous reactive coating solution including the treated contact lens immersed therein; and (c) heating the aqueous reactive coating solution including the treated contact lens immersed therein and having the third pH to the third temperature ($T_3$) and then maintaining the third temperature ($T_3$) for third period of time ($t_3$) to form a coated contact lens have a hydrogel coating thereon.

3. The method of claim 1, wherein the step of forming a coated contact lens have a hydrogel coating thereon is carried out by:

(a) immersing the treated contact lens obtained in step (3) in an aqueous reactive coating solution which has a fourth temperature of about 30° C. or lower and the third pH and which comprises the water-soluble, thermally-crosslinkable hydrophilic polymeric material having azetidinium groups and at least one ophthalmic salt at a concentration of at least 20 mM; and (b) heating the aqueous reactive coating solution including the treated contact lens immersed therein and having the third pH to the third temperature and then maintaining the third temperature for the third period of time to form a coated contact lens have a hydrogel coating thereon.

4. The method of claim 1, wherein the step of forming a coated contact lens have a hydrogel coating thereon is carried out by:

(a) obtaining an aqueous reactive coating solution which has a fourth temperature of about 30° C. or lower and a fourth pH of about 8.0 or less and which comprises the water-soluble, thermally-crosslinkable hydrophilic polymeric material having azetidinium groups and at least one ophthalmic salt at a concentration of at least 20 mM;

(b) raising the fourth pH to the third pH by adding a base into the aqueous reactive coating solution;

(c) immersing the treated contact lens obtained in step (3) in the aqueous reactive coating solution having the third pH and the fourth temperature within about 1.5 hours or shorter after step (b); and (d) heating the aqueous reactive coating solution including the treated contact lens immersed therein and having the third pH to the third temperature and then maintaining the third temperature for the third period of time to form a coated contact lens have a hydrogel coating thereon.

5. The method of claim 1, wherein the coating solution is obtained by dissolving the polyanionic polymer in water or a mixture of water with propylene glycol or polyethylene glycol having a number average molecular weight of about 400 Daltons or less and then adjusting pH to the first pH.

6. The method of claim 5, wherein the polyanionic polymer is polyacrylic acid, polymethacrylic acid, poly(ethylacrylic acid), poly(propyacrylic acid), poly(acrylic acid-co-methacrylic acid), poly(acrylic acid-co-ethylacrylic acid), poly(acrylic acid-co-propylacrylic acid), poly[ethylacrylic acid-co-(meth)acrylic acid], poly[propylacrylic acid-co-(meth)acrylic acid], poly[ethylacrylic acid-co-propylacrylic acid], or mixtures thereof.

7. The method of claim 6, wherein the coating solution comprises about 50% or less by weight of any organic solvent.

8. The method of claim 6, wherein the coating solution comprises about 50% or less by weight of water.

9. The method of claim 6, wherein the first period of time ti is from about 5 minutes to about 240 minutes.

10. The method of claim 9, wherein the treated contact lens obtained in step (2) is rinsed with water.

11. The method of claim 9, wherein the treated contact lens obtained in step (2) is rinsed with an aqueous solution having a pH from about 6.0 to about 8.0, wherein the aqueous solution comprises at least one ophthalmically compatible salt selected from the group consisting of NaCl, KCl, sodium and potassium salts of phosphoric acid, carbonic acid, boric acid, acetic acid, and citric acid, and combinations thereof.

12. The method of claim 11, wherein the second temperature $T_2$ is at least about 5° C. lower than the first temperature $T_1$ (i.e., $T_1-T_2 \geq 5°$ C.), wherein the second period of time $t_2$ is from about 5 minutes to about 240 minutes.

13. The method of claim 12, wherein the third temperature $T_3$ is about 28° C. or lower, wherein the fourth pH is from about 6.0 to about 8.0.

14. The method of claim 13, wherein the aqueous reactive coating solution comprises at least 25 mM of said at least one ophthalmically compatible salt.

15. The method of claim 14, wherein said at least one ophthalmically compatible salt is selected from the group consisting of NaCl, KCl, sodium and potassium salts of phosphoric acid, carbonic acid, boric acid, acetic acid, and citric acid, and combinations thereof.

16. The method of claim 15, wherein the third pH is from about 9.5 to about 11.0.

17. The method of claim 16, wherein the base is selected from the group consisting of NaOH, KOH, NH$_4$OH, K$_2$CO$_3$, Na$_2$CO$_3$, and combinations thereof.

18. The method of claim 17, wherein the third temperature is from about 40° C. to about 60° C., wherein the third period of time $t_3$ is from about 5 minutes to about 240 minutes.

19. The method of claim 18, wherein the thermally-crosslinkable hydrophilic polymeric material is a partially-crosslinked polymeric material that comprises a three-dimensional network and the azetidinium groups within the network or being attached to the network.

20. The method of claim 19, wherein the thermally-crosslinkable hydrophilic polymeric material is a partial reaction product of at least one azetidinium-containing polymer with at least one hydrophilicity-enhancing agent having at least one carboxyl, primary amine, secondary amine, or thiol group.

* * * * *